United States Patent
Ohki et al.

(10) Patent No.: US 9,940,693 B2
(45) Date of Patent: Apr. 10, 2018

(54) INFORMATION PROCESSING FOR DISPLAY OF CONTENT BASED ON IMPORTANCE LEVEL

(71) Applicant: SONY CORPORATION, Tokyo (JP)

(72) Inventors: Yoshihito Ohki, Tokyo (JP); Daiki Nogami, Nagano (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/407,151

(22) PCT Filed: Aug. 1, 2013

(86) PCT No.: PCT/JP2013/004670
§ 371 (c)(1),
(2) Date: Dec. 11, 2014

(87) PCT Pub. No.: WO2014/030307
PCT Pub. Date: Feb. 27, 2014

(65) Prior Publication Data
US 2015/0109342 A1    Apr. 23, 2015

(30) Foreign Application Priority Data
Aug. 24, 2012    (JP) ................ 2012-185772

(51) Int. Cl.
*G06T 3/40* (2006.01)
*G06F 17/30* (2006.01)
*H04N 21/482* (2011.01)

(52) U.S. Cl.
CPC .......... *G06T 3/40* (2013.01); *G06F 17/30058* (2013.01); *H04N 21/4826* (2013.01); *G06T 2207/20004* (2013.01)

(58) Field of Classification Search
CPC ............. G06F 3/0482; G06F 17/30743; G06F 17/30867; H04L 67/22; G06Q 20/102; H04N 5/445
See application file for complete search history.

(56) References Cited

U.S. PATENT DOCUMENTS

| | | | | |
|---|---|---|---|---|
| 6,704,048 B1 * | 3/2004 | Malkin | ............ | G06T 3/40 348/14.1 |
| 7,146,626 B1 * | 12/2006 | Arsenault | ............ | H04N 5/445 348/E5.099 |

(Continued)

FOREIGN PATENT DOCUMENTS

JP    2006-237876 A    9/2006

OTHER PUBLICATIONS

NPL: Helen Mongan-Rallis, Photoshop Guidelines, Jun. 10, 2005.*

(Continued)

*Primary Examiner* — Devona Faulk
*Assistant Examiner* — Kevin Wu
(74) *Attorney, Agent, or Firm* — Chip Law Group

(57) ABSTRACT

A system includes a content obtaining circuit configured to obtain a plurality of content and information related to the content from at least one of a plurality of sources, an importance obtaining circuit configured to obtain an importance level for each content, and a display control circuit configured to generate data to control a display of an image corresponding to each of the plurality of content. The importance level is based on the information related to the content. The display control circuit determines a size of each image on a display screen based on the importance level for each content.

18 Claims, 24 Drawing Sheets

(56) References Cited

U.S. PATENT DOCUMENTS

| | | | |
|---|---|---|---|
| 7,991,770 B2* | 8/2011 | Covell | G06F 17/30743 |
| | | | 704/256 |
| 2002/0019743 A1* | 2/2002 | Nakamura | G06Q 20/102 |
| | | | 705/40 |
| 2004/0189693 A1* | 9/2004 | Kenig | G06F 11/323 |
| | | | 715/736 |
| 2009/0287657 A1* | 11/2009 | Bennett | G06F 17/30867 |
| 2010/0082650 A1* | 4/2010 | Wong | H04L 67/22 |
| | | | 707/758 |
| 2010/0153885 A1* | 6/2010 | Yates | G06F 3/0482 |
| | | | 715/841 |
| 2012/0151383 A1 | 6/2012 | Kazan et al. | |
| 2012/0317109 A1* | 12/2012 | Richter | G06F 17/30867 |
| | | | 707/734 |

OTHER PUBLICATIONS

OSXDaily, Jul. 5, 2010, How to Resize a Window That is Too Big or Off Screen in Mac OS.*

International Search Report dated Nov. 12, 2013 in PCT/JP2013/004670.

* cited by examiner

| Application | Content |
|---|---|
| SNS | Posted comment |
| Image sharing service | Posted image |
| Music player | Music content |
| Photograph viewer | Photograph data |
| Telephone book | Contact information |
| File browser | File |
| Mailer | Message |
| Program listing | Program information |
| Store front | Commodity information |

FIG.2

| Application | Index used for calculation | Examples of method of obtaining/calculating parameter |
| --- | --- | --- |
| Common | Number of times content is browsed | Obtain by using service's API |
| Common | Content size | Obtain length of text, size of image, length of movie, and the like by using service's API or OS's API |
| SNS | Feedback | Obtain number of comments, number of times content is added to favorites, number of retweets (twitter), number of "likes" (Facebook), value of rating, and the like by using service's API, and add weight to combine |
| SNS | Distance in social graph | Obtain relationship that is represented by how many people are linked, and obtain whether relationship is in unidirectional relationship or in bidirectional relationship by using SNS's API |
| Music player | Number of times of reproduction | Obtain/calculate number of times of reproduction for each artist or album by using music service's API or OS's API |
| Music player | Number of songs | Obtain/calculate number of songs for each artist by using music service's API or OS's API |
| Photograph viewer | Number of people | Extract number of people in photograph by using result of character/face recognition through image analysis, and add higher score to character in case where character is user's friend/acquaintance by using photograph service's character recognition API or OS's character recognition API |
| Photograph viewer | Quality | Obtain user's rating value by using photograph service's API or OS's API, or use result obtained from scoring exposure/composition based on image analysis |
| Telephone book | Frequency of calls/communication | Obtain and combine call history or a message transmitting/receiving history by using OS's API |

FIG.8

| Application | Index used for calculation | Examples of method of obtaining/calculating parameter |
|---|---|---|
| File browser | Capacity | Obtain by using OS's API |
| Mailer | Number of messages in same thread | Obtain by using mail service's API or mail application's API |
| Program listing | Number of recording reservations/viewing reservations | Obtain by using recording service (torne)'s API |
| Store front | Relevance | Obtain degree of match for user's taste by using store (e.g., Amazon)'s API |

FIG.9

Order A

INFORMATION PROCESSING FOR DISPLAY OF CONTENT BASED ON IMPORTANCE LEVEL

TECHNICAL FIELD

The present disclosure relates to an information processing apparatus for displaying content provided by, for example, network service, to an information processing method, and to a program encoded on a non-transitory computer readable medium.

BACKGROUND ART

As a display method for displaying, on a display screen, a plurality of pieces of content data such as a still image and a moving image, a display method called thumbnail display or index display has been known. For example, in an index display method disclosed in Patent Literature 1, when a plurality of pieces of image data are displayed on a TV monitor or the like, pieces of image data having the same aspect ratio are selected. Then, reduced images of the pieces of image data thus selected are simultaneously index-displayed on a TV monitor. At this time, depending on the aspect ratio of the pieces of image data displayed on the TV monitor, the number of pieces of image data to be displayed is appropriately changed. Accordingly, it is intended that more information is simply displayed in a limited display space (e.g., paragraphs [0022] to [0032] in the specification of Patent Literature 1).

Citation List

Patent Literature

PTL 1: Japanese Patent Application Laid-open No. 2006-237876

SUMMARY

Technical Problem

As described above, in the case where a plurality of pieces of content are displayed, it is desirable that the displayed content can be easily recognized or desired content can be easily searched for, for example. Specifically, there is a need for a display method that allows a user to efficiently browse a plurality of pieces of content.

In view of the circumstances as described above, it is desirable to provide an information processing apparatus that is capable of displaying a plurality of pieces of content so that browsing can be efficiently performed, an information processing method, and a program encoded on a non-transitory computer readable medium.

Solution to Problem

According to an embodiment of the present disclosure, there is provided an information processing apparatus including an obtaining unit, a first setting unit, a calculation unit, a second setting unit, and an arrangement unit. The obtaining unit is configured to obtain a plurality of pieces of content to be displayed. The first setting unit is configured to set an arrangement condition for arranging the plurality of pieces of content. The calculation unit is configured to calculate importance of each of the plurality of pieces of content. The second setting unit is configured to set a display condition for each of the plurality of pieces of content based on the importance calculated for each of the plurality of pieces of content. The arrangement unit is configured to arrange the plurality of pieces of content based on the arrangement condition and the display condition set for each of the plurality of pieces of content.

In the information processing apparatus, an arrangement condition for arranging a plurality of pieces of content is set. Moreover, importance of each of the plurality of pieces of content is calculated, and a display condition for each of the plurality of pieces of content is set based on the importance. The plurality of pieces of content are arranged based on the arrangement condition and the display condition set for each of the plurality of pieces of content. As a result, it is possible to display a plurality of pieces of content so that browsing can be efficiently performed.

The calculation unit may calculate the importance based on at least one parameter relating to the content. As described above, the importance may be calculated based on at least one parameter relating to the content.

The first setting unit may set arrangement order of the plurality of pieces of content as the arrangement condition. By setting arrangement order of the plurality of pieces of content, browsing can be efficiently performed.

The arrangement unit may determine whether or not arrangement of the plurality of pieces of content is possible. In this case, in a case where the arrangement is determined not possible, the second setting unit may change the display condition. In the information processing apparatus, whether or not arrangement of the plurality of pieces of content is possible is determined. Then, in the case where the arrangement of the plurality of pieces of content is not possible, the display condition set for each of the plurality of pieces of content is changed. Accordingly, it is possible to display the content based on the arrangement condition and the display condition.

The arrangement unit may determine whether or not the arrangement is possible for each of the plurality of pieces of content. In this case, the second setting unit may change the display condition set for the content that is determined not possible to be arranged. As described above, whether or not the arrangement is possible may be determined for each of the plurality of pieces of content, and the display condition set for the content that is determined not possible to be arranged may be changed.

The second setting unit may set, as the display condition, a display size obtained based on the importance for each of the plurality of pieces of content. As described above, as the display condition, a display size obtained based on the importance may be set. Accordingly, the plurality pieces of content are displayed so that their display sizes are different from each other depending on the importance while the plurality pieces of content are arranged in a predetermined arrangement condition. As a result, it is possible to display a plurality of pieces of content so that browsing can be efficiently performed.

The second setting unit may associate a plurality of size ranks with the importance, each of the plurality of size ranks including at least one display size, and set any of the at least one display size for each of the plurality of pieces of content, the size rank associated with the importance of the content including the at least one display size. In this way, the display size obtained based on the importance may be changed.

The arrangement unit may determine whether or not arrangement of the plurality of pieces of content is possible for each of the plurality of pieces of content. In this case, the second setting unit may set a different display size included in the size rank for the content that is determined not possible to be arranged, the size rank including the display size set for the content. Because a different display size included in the same size rank is set, it is possible to change the display size while maintaining the association of the size rank with the importance.

The arrangement unit may determine whether or not arrangement of the plurality of pieces of content is possible for each of the plurality of pieces of content. In this case, the second setting unit may set the display size included in a different size rank for the content that is determined not possible to be arranged, the different size rank being different from the size rank including the display size set for the content. As described above, by selecting a display size from a different size rank, it is possible to display the plurality of pieces of content while flexibly reflecting the arrangement condition and the display condition.

The calculation unit may calculate a plurality of pieces of importance as the importance. In this case, the second setting unit may set a plurality of display conditions for each of the plurality of pieces of content based on the plurality of pieces of importance thus calculated. By setting a plurality of display condition based on a plurality of pieces of importance, it is possible to efficiently browse the plurality of pieces of content.

According to an embodiment of the present disclosure, there is provided an information processing method including, by a computer, obtaining a plurality of pieces of content to be displayed. An arrangement condition for arranging the plurality of pieces of content is set. Importance of each of the plurality of pieces of content is calculated. A display condition is set for each of the plurality of pieces of content based on the importance calculated for each of the plurality of pieces of content. The plurality of pieces of content are arranged based on the arrangement condition and the display condition set for each of the plurality of pieces of content.

According to an embodiment of the present disclosure, there is provided a program that causes a computer to execute the following steps of obtaining a plurality of pieces of content to be displayed, setting an arrangement condition for arranging the plurality of pieces of content, calculating importance of each of the plurality of pieces of content, setting a display condition for each of the plurality of pieces of content based on the importance calculated for each of the plurality of pieces of content, and arranging the plurality of pieces of content based on the arrangement condition and the display condition set for each of the plurality of pieces of content.

In another embodiment of the present invention, an apparatus includes a content obtaining circuit configured to obtain a plurality of content and information related to the content from at least one of a plurality of sources, an importance obtaining circuit configured to obtain an importance level for each content, and a display control circuit configured to generate data to control a display of an image corresponding to each of the plurality of content. The importance level is based on the information related to the content. The display control circuit determines a size of each image on a display screen based on the importance level for each content.

Advantageous Effects of Invention

As described above, according to the present disclosure, it is possible to display a plurality of pieces of content so that browsing can be efficiently performed.

BRIEF DESCRIPTION OF DRAWINGS

FIG. 2 is a table showing an example of a plurality of pieces of content to be displayed.

FIG. 8 is a table showing an example of parameters used for calculating importance.

FIG. 9 is a table showing another example of the parameters used for calculating importance.

DESCRIPTION OF EMBODIMENTS

Hereinafter, embodiments according to the present disclosure will be described with reference to the drawings.

(Configuration of Information Processing Apparatus)

Figure 1:
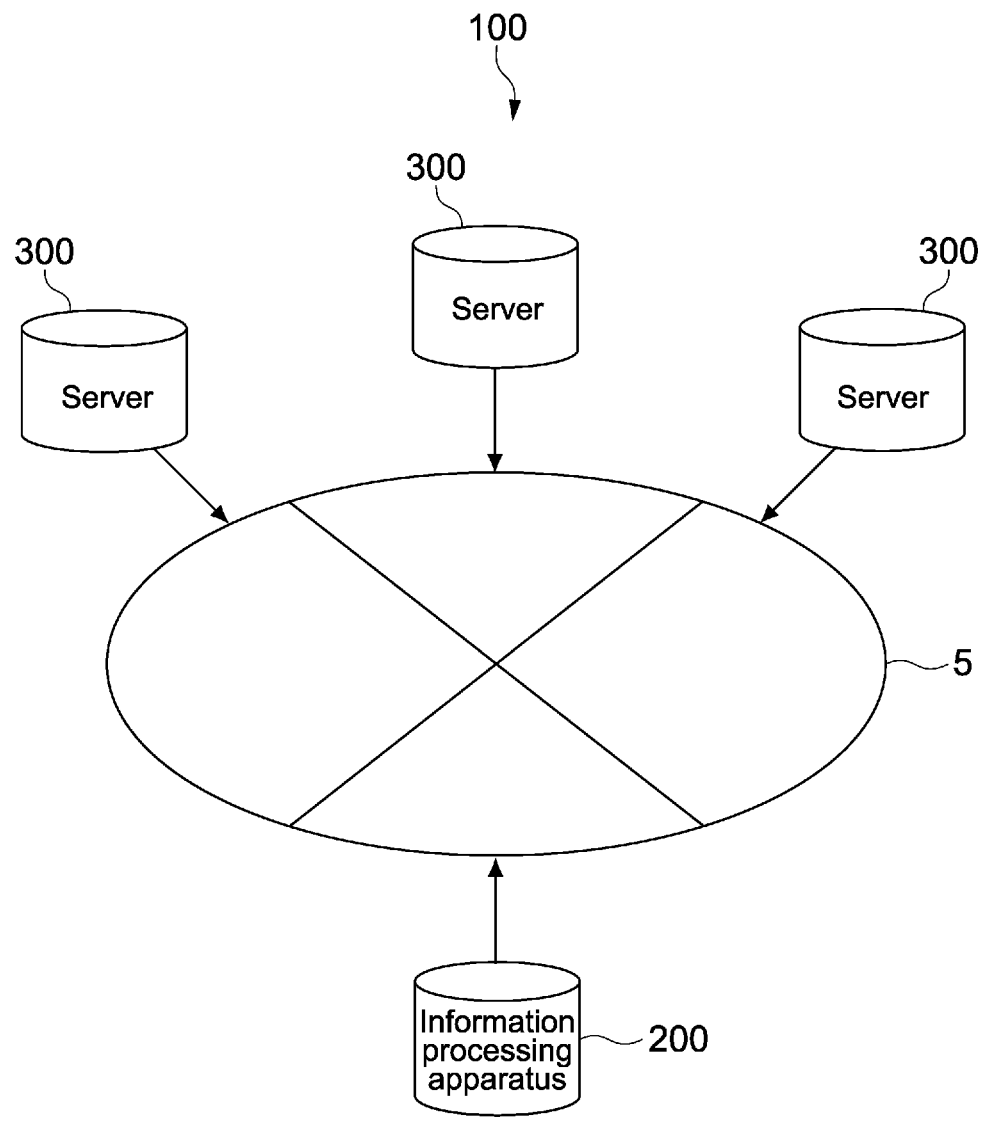
FIG. 1 is a schematic diagram showing a network system including an information processing apparatus according to an embodiment of the present disclosure.

FIG. 1 is a schematic diagram showing a network system including an information processing apparatus according to an embodiment of the present disclosure.

A network system 100 includes an Internet 5 serving as a global network, and an information processing apparatus 200 according to this embodiment, which can be connected to the Internet 5. Moreover, the network system 100 includes a plurality of servers 300 that are capable of providing the information processing apparatus 200 with network service through the Internet 5.

The Internet 5 is typically a network that uses TCP/IP (Transmission Control Protocol/Internet Protocol). However, a global network using another protocol may be used. It should be noted that the apparatuses may be connected to each other through not a global network but a LAN (Local Area Network) or the like.

Examples of the network service provided from the server 300 to the information processing apparatus 200 include providing various types of content, providing content data such as a movie and music, providing information such as news, direction of an online message board, serving as a mediator of an online chat, and providing a game. Other examples of the network service include service such as SNS (Social Network Service) and movie sharing service. However, the network service is not limited thereto, and other various types of network service may be used.

As will be described later, in the information processing apparatus 200 according to this embodiment, a list of data or the like posted from another user who uses content such as a movie and music or SNS is displayed on a display unit. Moreover, a list of still images, moving images, or the like, which are uploaded through movie sharing service, is also displayed in the display unit. Here, a concept comprehensively including content data such as music content, data posted to SNS, and the like, is referred to as "a plurality of pieces of content to be displayed."

FIG. 2 is a table showing an example of the plurality of pieces of content to be displayed. In FIG. 2, applications dealing with the content are also described.

As shown in FIG. 2, examples of the plurality of pieces of content to be displayed include a posted comment (SNS), a posted image (image sharing service), music content (music player), photograph data (photograph viewer), contact information (telephone book), a file (file browser), a message (mailer), program information (program listing), and commodity information (store front). It should be noted that a display method according to this embodiment can be applied to content other than those shown in FIG. 2. Only one type of content may be displayed, or two or more types of content may be displayed on a screen.

Moreover, the plurality of pieces of content displayed by the display method according to this embodiment are not limited to a case where they are obtained through the Internet 5. The plurality of pieces of content may be stored in a storage unit or the like included in the information processing apparatus 200, or may be retrieved from a storage medium mounted on the information processing apparatus 200. Specifically, the method of obtaining the plurality of pieces of content by the information processing apparatus 200 is not limited.

Figure 3:
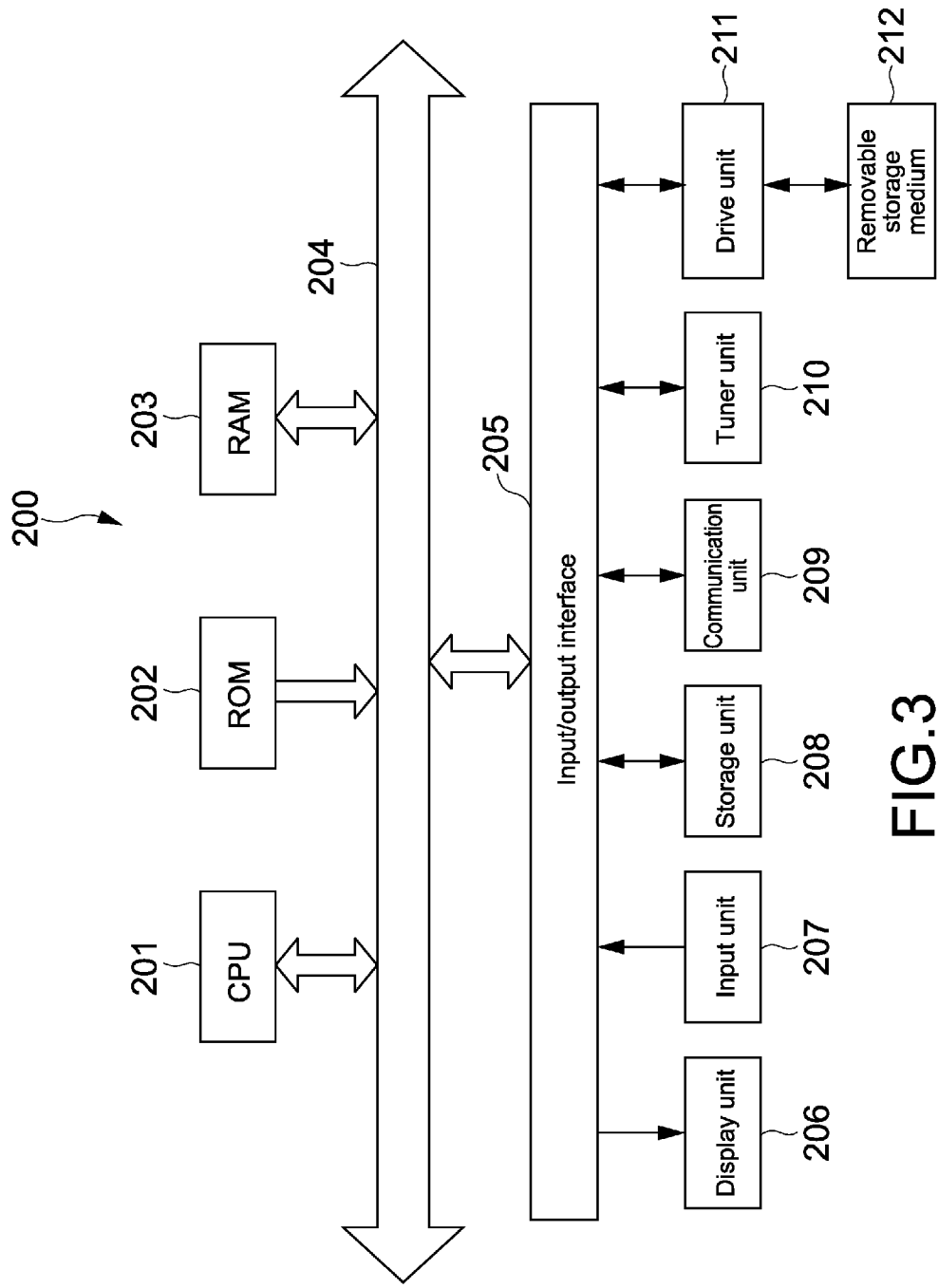
FIG. 3 is a schematic block diagram showing a configuration example of the information processing apparatus according to this embodiment.

FIG. 3 is a schematic block diagram showing a configuration example of the information processing apparatus 200 according to this embodiment. As the information processing apparatus 200, various computers such as a PC (Personal Computer) are used. For example, a portable terminal such as a cellular phone, a smartphone, and a tablet, and a TV apparatus may be used.

The information processing apparatus 200 includes a CPU (Central Processing Unit) 201, a ROM (Read Only Memory) 202, a RAM (Random Access Memory) 203, and input/output interface 205, and a bus 204 that connects those components to each other.

To the input/output interface 205, a display unit 206, an input unit 207, a storage unit 208, a communication unit 209, a tuner unit 210, a drive unit 211 and the like are connected.

The display unit 206 is, for example, a display device using liquid crystal, EL (Electro-Luminescence), a CRT (Cathode RayTube), or the like.

The input unit 207 is, for example, a controller, a pointing device, a keyboard, a touch panel, and another operating apparatus. In the case where the input unit 207 includes a touch panel, the touch panel may be integrated with the display unit 206.

The storage unit 208 is a non-volatile memory device such as an HDD (Hard Disk Drive), a flash memory, and another solid-state memory.

The tuner unit 210 receives content data of a program distributed from a broadcast station via digital terrestrial broadcasting, CS digital broadcasting, and BS digital broadcasting, and demodulates a video signal and an audio signal, for example.

The drive unit 211 is, for example, a device that is capable of driving a removable storage medium 212 such as an optical storage medium, a floppy (registered trademark) disk, a magnetic storage tape, and a flash memory. On the other hand, the storage unit 208 is often used as a device mounted on the information processing apparatus 200 in advance, which mainly drives a non-removable storage medium.

The communication unit 209 is a modem, a router, or another communication apparatus, which are capable of connecting to a LAN, WAN (Wide Area Network), or the like to communicate with another device. The communication unit 209 may perform wired or wireless communication. The communication unit 209 is often used separately from the information processing apparatus 200.

An information process performed by the information processing apparatus 200 having the hardware configuration as described above is realized by software stored in the storage unit 208, the ROM 202, or the like, and a hardware source of the information processing apparatus 200. Specifically, the information process is realized by loading a program constituting software in which the CPU 201 is stored in the storage unit 208, the ROM 202, or the like, into the RAM 203 to execute the program.

The program is installed in the information processing apparatus 200 through, for example, a storage medium. Alternatively, the program may be installed in the information processing apparatus 200 through a global network or the like.

In this embodiment, by the CPU 201 that operates based on the program, first and second setting units, a calculation unit, and an arrangement unit are realized.

(Overview of Displaying Method)

Figure 4:
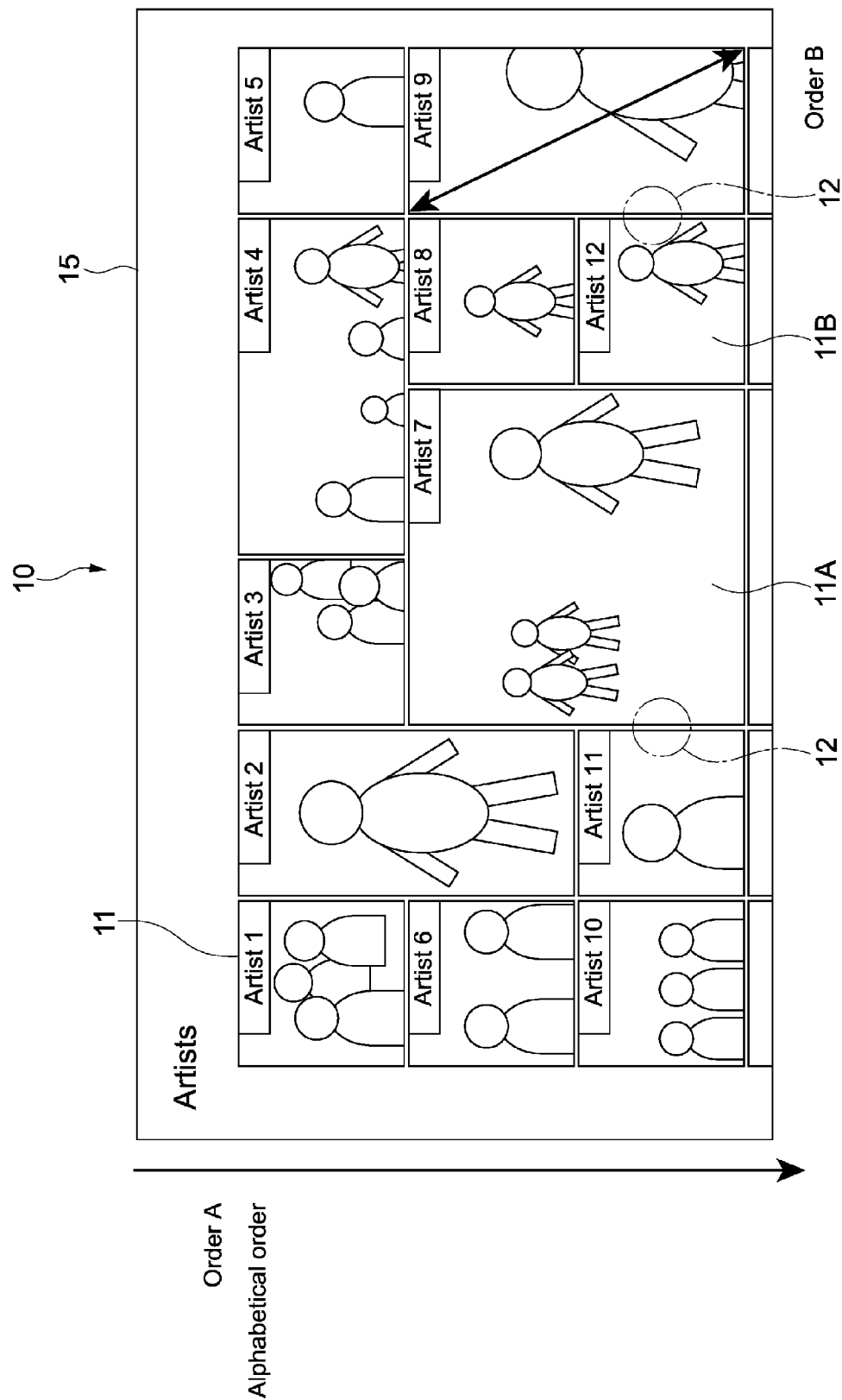
FIG. 4 is a diagram showing a case where pieces of music content are obtained as the plurality of pieces of content and a list of the pieces of music content is displayed.
Figure 5:
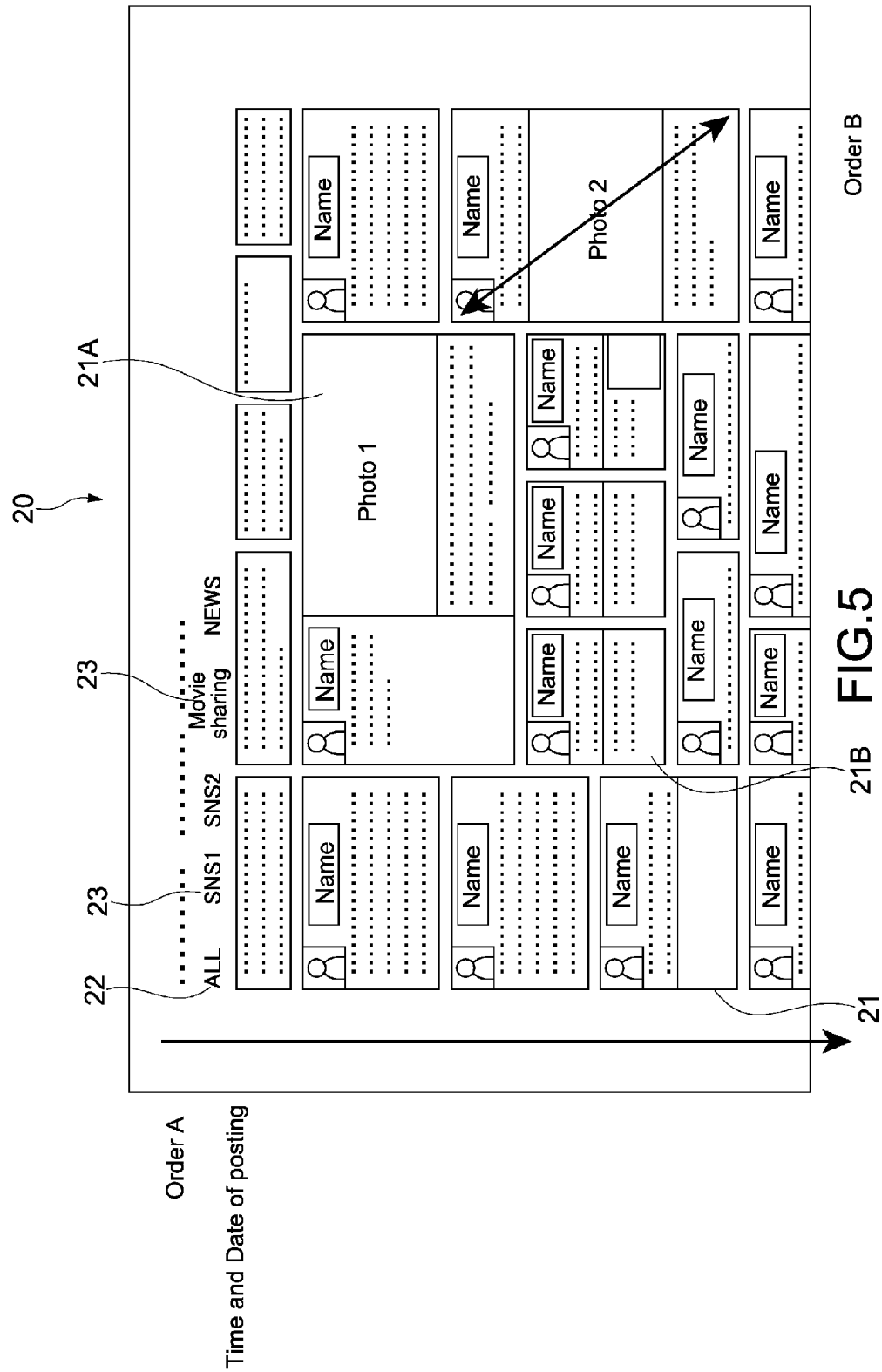
FIG. 5 is a diagram showing a case where a list of comments posted to SNS (social network service), movies uploaded to movie sharing service, and the like is displayed as the plurality of pieces of content.

An overview of a display method realized by the information processing apparatus 200 according to this embodiment will be described. FIG. 4 and FIG. 5 are schematic diagrams for explaining the overview.

FIG. 4 is a diagram showing a case where pieces of music content are obtained as the plurality of pieces of content and a list of the pieces of music content is displayed. A list display 10 shown in FIG. 4 may be displayed on the display unit 206 included in the information processing apparatus 200, or may be displayed on a display apparatus serving as an external apparatus connected to the information processing apparatus 200.

A plurality of pieces of content 11 are arranged based on a predetermined arrangement condition. Specifically, in this embodiment, an arrangement condition for arranging the plurality of pieces of content 11 is set. Here, the arrangement condition is typically a condition relating to how to arrange the plurality of pieces of content 11 in what order and at what location. In the example shown in FIG. 4, names of artists who play music are displayed in alphabetical order (artists 1 to 12 correspond to the alphabetical order of the names). In the order of the names, the plurality of pieces of content 11 are displayed from top left to bottom right of a screen 15. It should be noted that the arrangement condition to be set is not limited, and can be appropriately set.

The condition relating to how to arrange the plurality of pieces of content 11 in what order and at what location corresponds to setting of arrangement order of a plurality of pieces of content as an arrangement condition.

Moreover, in this embodiment, importance (score) is calculated for each of the plurality of pieces of content 11. The importance shows how important the content 11 is for a user. For example, the content 11 that is highly likely to attract user's attention or to be searched for is set as content having high importance. Moreover, for example, the content 11 that is expected to be suitable for a user's taste is also set as content having high importance.

The importance is calculated based on at least one parameter relating to the content 11. In the example shown in FIG. 4, the importance is calculated based on the number of times the music content is reproduced, an evaluation value set by a user, the number of times the music content is added to favorites, and the like. In addition, the importance may be calculated based on another user's evaluation or the like, which is obtained by the server 300 that distributes music content through the Internet 5 and is transmitted to the information processing apparatus 200. Alternatively, information for calculating the importance may be added to the content 11 as metadata.

In later, parameters to be an index used for calculating the importance are exemplified (see FIG. 8 and FIG. 9).

Based on the importance calculated for each of the plurality of pieces of content 11, a display condition is set for each of the plurality of pieces of content 11. In the example shown in FIG. 4, as the display condition, a display size obtained based on the importance is set for each of the plurality of pieces of content 11. Typically, content having higher importance is displayed larger (e.g., content 11A). Then, content having lower importance is displayed smaller (e.g., content 11B).

The plurality of pieces of content 11 are arranged based on the set arrangement condition and the display condition (display size) set for each of the plurality of pieces of content 11. Accordingly, the list display 10 shown in FIG. 4 is realized. Specifically, based on the arrangement condition and the display condition, display information for displaying the content 11 is generated.

The display information for displaying the content 11 is, for example, a thumbnail image of the content 11, and an image posted to SNS. In the example shown in FIG. 4, the display information is generated by using an image of an artist photograph. In addition, an image of a CD (Compact Disc) jacket may be used for generating the display information. Information on the images is obtained from the server 300 that distributes music content. Alternatively, the information may be obtained from another server 300 through the Internet 5.

The list display 10 shown in FIG. 4 is displayed by the display method according to this embodiment, which allows a user to easily find the content 11 having high importance while browsing the pieces of music content in alphabetical order. As a result, browsing can be efficiently performed. It should be noted that the difference in the display sizes of the plurality of pieces of content 11 forms a part (e.g., a part 12) in which the positional relationship between the plurality of pieces of content 11 and the display order are appropriately adjusted. However, without any concern for the part, the user can browse the pieces of content 11.

FIG. 5 is a diagram showing a case where a list of comments posted to SNS, movies uploaded to movie sharing service, and the like is displayed as a plurality of pieces of content 21. On a list display 20 shown in FIG. 5, four types of pieces of content 21, i.e., comments posted to two different SNSs (SNS1 and SNS2), a movie uploaded into movie sharing service, news distributed from the server 300, can be displayed. It should be noted that as the news, information called RSS (RDF Site Summary), which represents the summary of the news, an update state of an article, or the like, may be obtained.

In the example shown in FIG. 5, if an ALL button 22 is pressed, the four types of pieces of content 21 are all displayed. If the SNS1 or a button 23 that represents the name of movie sharing service is pressed, pieces of content 21 to be listed on the display unit 206 are appropriately selected. As described above, the type of the pieces of content 21 to be listed may be selected.

In the example shown in FIG. 5, as the arrangement condition, arrangement in chronological order is set. Therefore, in order of a time and date a comment or movie is posted, the plurality of pieces of content 21 are displayed. The plurality of pieces of content 21 are sequentially displayed from top left to bottom right of a screen.

Importance of each of the plurality of pieces of content 21 is calculated. For example, in the case where the content 21 is a comment posted to SNS, the importance is calculated by using, as at least one parameter, the length of the comment, the size of an image attached to the comment, the number of replies to the comment, the number of times the comment is added to favorites, and the like.

In the case where the content 21 is an uploaded movie, the importance is calculated based on the length of the movie, the number of comments on the movie, the number of times the movie is added to favorites, and the like. In the case where the content 21 is news, the number of times the news is browsed, the number of comments on the news, and the like are used as the parameter. The at least one parameter described above is merely an example, and another element may be used as the parameter.

Based on the calculated importance, a display size obtained based on the importance is set as the display condition. Here, content having higher importance is displayed larger (e.g., content 21A). Then, content having lower importance is displayed smaller (e.g., content 21B). Accordingly, it is possible to confirm content 21 having high importance while sequentially browsing a newly posted comment or the like. As a result, browsing can be efficiently performed.

It should be noted that in the case where pieces of content to be displayed are selected by pressing the ALL button 22 or the SNS1 button 23, the pieces of content 21 thus selected are arranged based on the arrangement condition and the display condition. In this case, the relative degree of importance in the plurality of pieces of content 21 to be displayed is changed, which may change the display size.

It should be noted that the display condition is not limited to the setting of the display size. Examples of the display condition include setting of color display based on the importance. For content having high importance, a display condition in which a color that is easy to find such as red is set may be used.

In FIG. 4 and FIG. 5, an order A and an order B are described. The orders A and B can be considered to be a condition for displaying a list of the plurality of pieces of content 11 (21). For example, the order A corresponds to a predetermined arrangement condition. The order B corresponds to a display condition based on the importance.

In the example shown in FIG. 4, the order A represents arrangement in alphabetical order, and the order B represents setting of the display size obtained based on the importance. In the example shown in FIG. 5, the order A represents arrangement in order of time and date of posting, and the order B represents setting of the display size obtained based on the importance.

Figure 6:
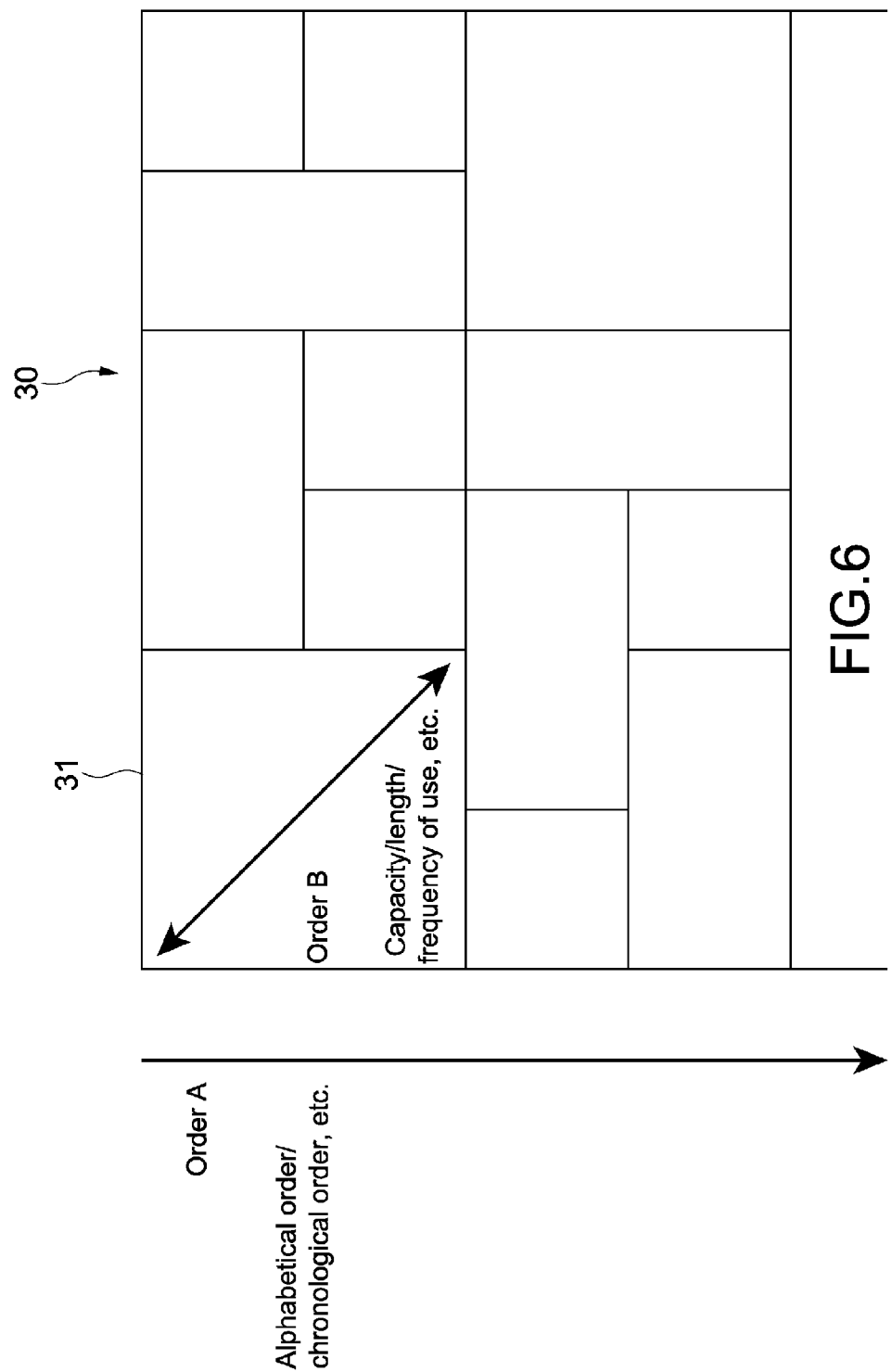
FIG. 6 is a diagram for explaining a display method according to this embodiment while focusing on two types of order.

FIG. 6 is a schematic diagram for explaining the display method according to this embodiment while focusing on the two orders A and B. As shown in FIG. 6, the display method for displaying a plurality of pieces of content 31 according to this embodiment can be regarded as a list display 30 based on the orders A and B. For example, examples of the order A include setting of an arrangement condition based on alphabetical order, chronological order such as a time and date of posting, or the like. Examples of the order B include setting of a display condition by using, as parameters, the capacity of the content 31 to be displayed, the length of a text or the like, frequency of use (e.g., frequency of reproduction), and the like (in FIG. 6, setting of a display size).

Therefore, the display method according to this embodiment is considered to be included in the technical idea that the plurality of pieces of content 31 are appropriately arranged to be displayed based on two or more conditions. The two or more conditions are not limited to the setting of the arrangement condition or setting of the display condition, and various conditions may be used.

(Operation of Information Processing Apparatus)

Figure 7:
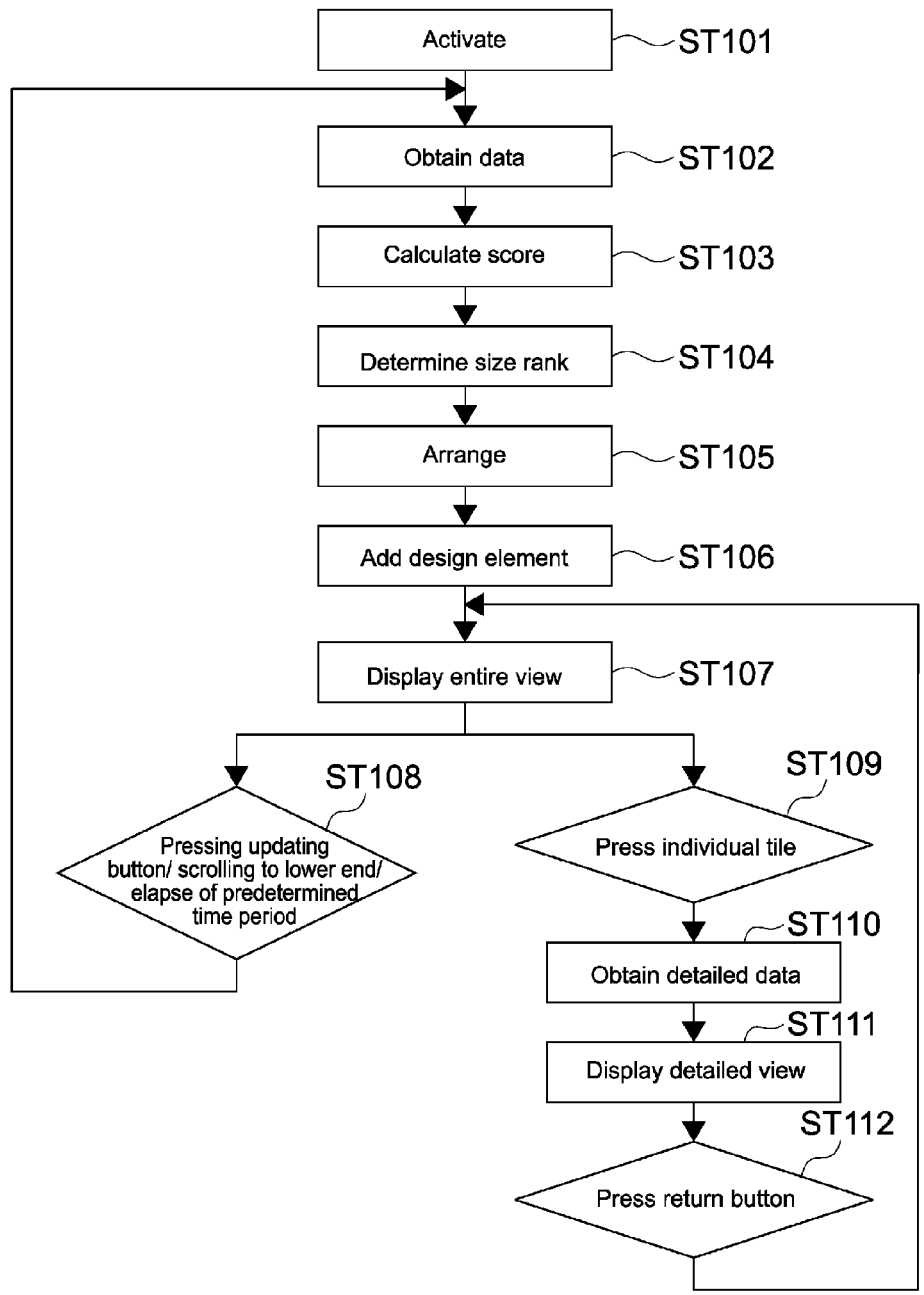
FIG. 7 is a flowchart showing an operation example of the information processing apparatus according to this embodiment.

An operation of the information processing apparatus 200 for realizing the display method described above will be described. FIG. 7 is a flowchart showing an operation example of the information processing apparatus 200.

An application for realizing the display method according to this method is activated (Step 101), and a plurality of pieces of content to be displayed are obtained (Step 102). The plurality of pieces of content are obtained through, for example, the Internet 5. In this case, the communication unit 209 functions as an obtaining unit. Alternatively, the plurality of pieces of content may be obtained from the removable storage medium 212. In this case, the drive unit 211 functions as the obtaining unit. Further, the plurality of pieces of content may be obtained through the tuner unit 210. In this case, the tuner unit 210 functions as the obtaining unit.

The number of pieces of content to be obtained may be set. For example, setting such as obtaining 100 pieces of content from the first (latest) to hundredth pieces of content may be performed in the case where the pieces of content are arranged in chronological order.

The importance (score) is calculated based on at least one parameter relating to the content (Step 103). Now, parameters to be an index used for calculating the importance are exemplified. FIG. 8 and FIG. 9 are tables showing an example of the parameters. In the tables, examples of the method of obtaining the parameter and method of calculating the parameter are also described.

In the table of FIG. 8, there is a column described as "common," which represents an application dealing with content. This represents a parameter that can be commonly used for the content of many applications. Examples of the parameter include the number of times the content is browsed. The number of times the content is browsed is obtained by, for example, using corresponding service's API (Application Programming Interface).

Other examples of the parameter include a content size. The content size is, for example, the length of a text, the size of an image, and the length of a movie. The content size is obtained through corresponding service's API or OS (Operating System)'s API.

Still other examples of the parameter include a feedback on the content. The feedback represents the number of comments on the content, the number of times the content is added to favorites, or the like. For example, the number of retweets in the SNS known as twitter (registered trademark), or the number of "likes" in Facebook (registered trademark) corresponds to the feedback. Moreover, a value of rating or the like is also used as the feedback. The feedback is obtained by, for example, using corresponding service's API. Moreover, the feedback may be appropriately weighted to be combined.

In SNS or the like, a distance in a social graph can be also used as the parameter. The distance in a social graph is, for example, a distance that represents a relationship between a posted comment and a user, which is represented by, for example, how many people are linked between a sender of the comment or the like and the user. For example, in the case of a person directly linked to the user (e.g., family), the distance is determined to be close. In the case of a person linked to the user through many people (e.g., celebrity), the distance is determined to be far. Moreover, the distance in a social graph may be calculated based on, for example, whether the user and the sender are in a unidirectional relationship or in a bidirectional relationship. The distance in a social graph is obtained by using corresponding SNS's API.

In a music player, the number of times of reproduction or the number of songs can be used as the parameter. The number of times of reproduction can be obtained and counted for each artist or album by using music service's API or OS's API. The number of songs is also obtained and counted for each artist or album by using API.

In a photograph viewer, the number of people in a photograph can be used as the parameter. The number of people can be extracted by, for example, using the result of character recognition or face recognition through image analysis. Moreover, a character in a photograph may be analyzed and setting of adding high importance to the character may be performed in the case where the character is a user's friend or acquaintance, for example. In the character recognition, a character in a photograph can be recognized by using corresponding photograph service's character recognition API or OS's character recognition API. Moreover, another analyzing method may be used.

Moreover, in a photograph viewer, the quality of a photograph may be used as the parameter. For example, a user's rating value is obtained by using corresponding photograph service's API or OS's API, or exposure, composition, or the like is scored through image analysis. Those results may be used as a parameter representing the quality of a photograph.

In a telephone book, for example, a frequency of calls or communication can be used as the parameter. For example, a call history or a message transmitting/receiving history is obtained and combined by using OS's API.

With reference to the table of FIG. 9, in a file browser, file capacity can be used as the parameter. The file capacity can be obtained by using OS's API.

In a mailer, for example, the number of messages in the same thread can be used as the parameter. The information can be obtained by using mail service's API or mail application's API.

In a program listing, the number of recording reservations or the number of viewing reservations can be used as the parameter. The information can be obtained by using recording service's API. Examples of the recording service include torne (registered trademark).

In a store front, relevance can be used as the parameter. The relevance is calculated based on, for example, whether or not the content is suitable for a user's taste. By, for example, using store's API, the degree of match for the user's taste can be obtained, and the degree of match can be used as the relevance. Examples of the store include an online shopping site such as Amazon (registered trademark).

In addition, for example, information on the latitude and longitude, which represent a photograph/movie shooting position, may be used as the parameter. Moreover, two or more parameters are weighted to be added, and a unique score, which is suitable for utilization properties of content or application, may be appropriately calculated.

Figure 10:
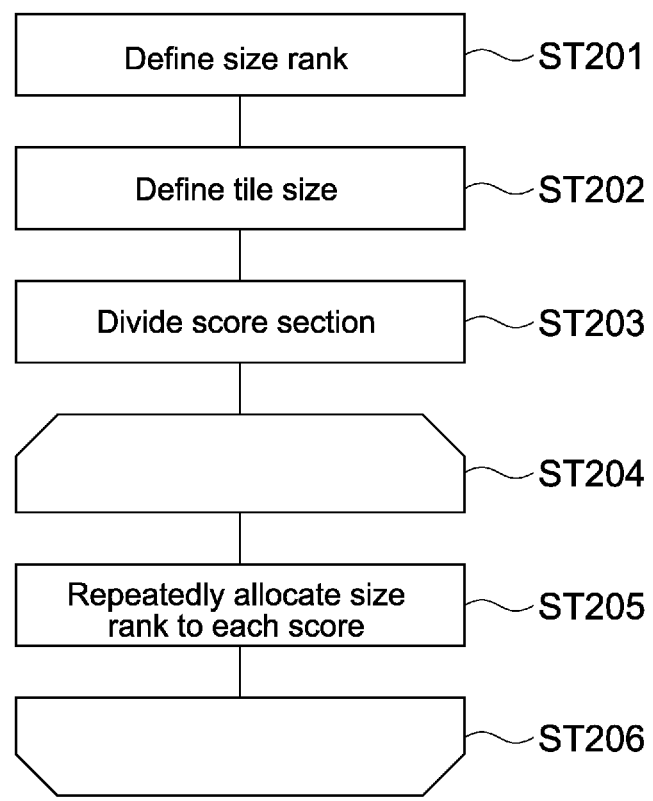
FIG. 10 is a flowchart showing in detail a process for determining a size rank shown in FIG. 7.
Figure 11:
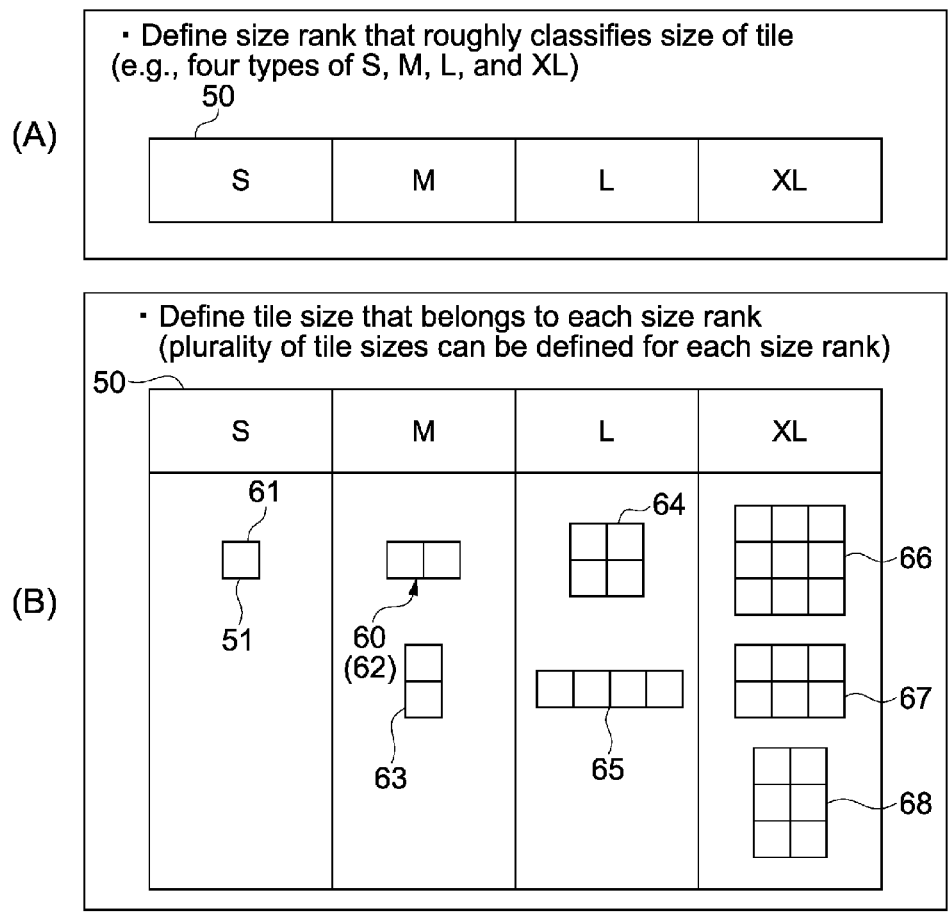
FIG. 11 are each a schematic diagram showing an example of the size rank.

In this embodiment, setting of the display size obtained based on the importance is performed in the following process. First, based on the importance, a size rank is determined for each of the pieces of content (Step 104). FIG. 10 is a flowchart showing in detail a process for determining the size rank. FIG. 11 are each a schematic diagram showing an example of the size rank.

First, the size rank is defined (Step 201). As shown in FIG. 11A, the size rank roughly classifies the display size. In this embodiment, four types of size ranks 50, i.e., S, M, L, and XL, which are described in order of the small display size, are defined (hereinafter, the size ranks 50 are described as size ranks S, M, L, and XL in some cases). It should be noted that in this embodiment, the display size of content is defined by a square tile 51. Therefore, FIG. 11A describes that the size of the tile is roughly classified.

A tile size 60 belonging to the size ranks 50 is defined (Step 202). The tile size 60 corresponds to the display size according to this embodiment, and is defined by the number and shape of tiles 51 (how the tiles are arranged).

As shown in FIG. 11B, for the size rank S, a tile size 61, which has one tile, is defined. For the size rank M, a tile size 62 and a tile size 63 are defined. The tile size 62 has two tiles arranged in parallel, and the tile size 63 has two tiles arranged in tandem. For the size rank L, a tile size 64 and a tile size 65 are defined. The tile size 64 has four tiles arranged in 2 rows and 2 columns, and the tile size 65 has four tiles arranged in parallel. For the size rank XL, a tile size 66, a tile size 67, and a tile size 68 are defined. The tile size 66 has nine tiles arranged in 3 rows and 3 columns, the tile size 67 has six tiles arranged in 3 rows and 2 columns, and the tile size 68 has six tiles arranged in 2 rows and 3 columns.

Setting of the number of size ranks 50 or the tile size 60 included in the size ranks 50 is not limited to those described above, and may be appropriately performed. Moreover, the setting is not limited to a case where the display size of content is defined by the tile 51. Moreover, the display size may be set so that the shape itself is not changed and only the size is changed.

Typically, the size ranks 50 and the tile size 60 are set in advance. However, when a plurality of pieces of content are obtained, the size ranks 50 and the tile size 60 may be appropriately set depending on the type of the content. Moreover, the size ranks 50 and the tile size 60 may be set by a user's instruction.

It should be noted that the size ranks S, M, L, and XL, for which at least one tile size 60 is defined, correspond to the plurality of size ranks having at least one display size in this embodiment. Then, the plurality of size ranks 50 are associated with the importance (score) in the following way.

Figure 12:
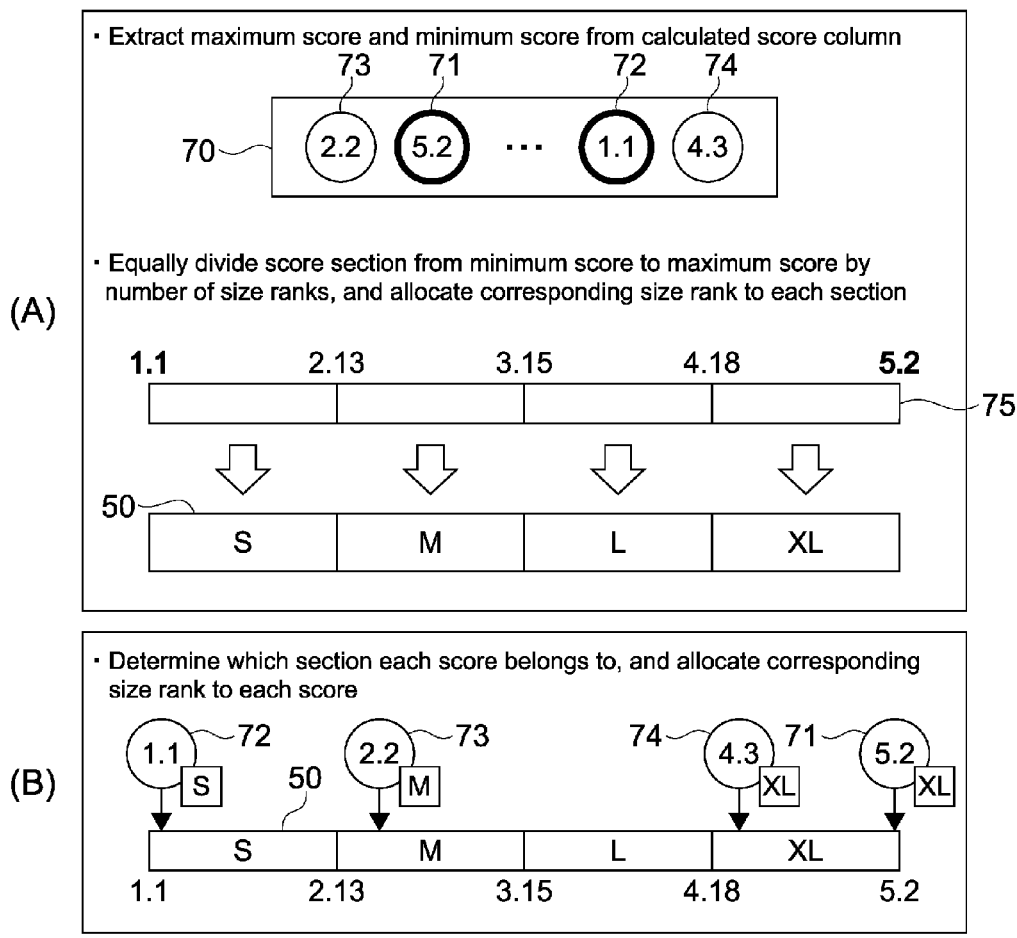
FIG. 12 are each a diagram for explaining a process for dividing a score section shown in FIG. 10.

First, a score section is divided (Step 203). FIG. 12 are each a diagram for explaining a process for dividing the score section. As shown in FIG. 12A, a maximum score and a minimum score are calculated from a column 70 including the score calculated for each of the plurality of pieces of content. Here, it is assumed that a score 71 having a score value of 5.2 is extracted as the maximum score, and a score 72 having a score value of 1.1 is extracted as the minimum score.

A score section from the minimum score to the maximum score is equally divided by the number of size ranks 50. Specifically, the score section from a value of 1.1 being the minimum score to a value of 5.2 being the maximum score is divided by 4 being the number of size ranks. As shown in FIG. 12A, because 4.1, which is a difference between 5.2 and 1.1, divided by 4 is about 1.03, a score section 75 is divided into 4 sections at values of 1.1, 2.13, 3.15, 4.18, and 5.2. The divided four sections are associated with the four size ranks S, M, L, and XL.

Based on the association, the size rank 50 is allocated to each score (Steps 204 to 206). As shown in FIG. 12B, which section each score calculated for each of the plurality of pieces of content belongs to is determined. Then, the corresponding size rank 50 is allocated to the score. For example, to the score 72 having a score value of 1.1, the size rank S is allocated. To a score 73 having a score value of 2.2, the size rank M is allocated. To a score 74 having a score value of 4.3 and the score 71 having a score value of 5.2, the size rank XL is allocated.

In this way, the scores 71 to 74 of content are associated with the size ranks S, M, L, and XL. Then, in the arrangement process shown in Step 105 of FIG. 7, any of the display sized included in the associated size ranks 50 is set for the content.

Specifically, in this embodiment, setting of the display size for each piece of content is performed with the arrangement process. This is because, in the case where pieces of content are arranged based on the set display size, whether or not arrangement of the pieces of content is possible is determined, and, in the case where the arrangement is determined not possible, the set display size is changed. Accordingly, it is possible to appropriately set the display size.

Figure 13:
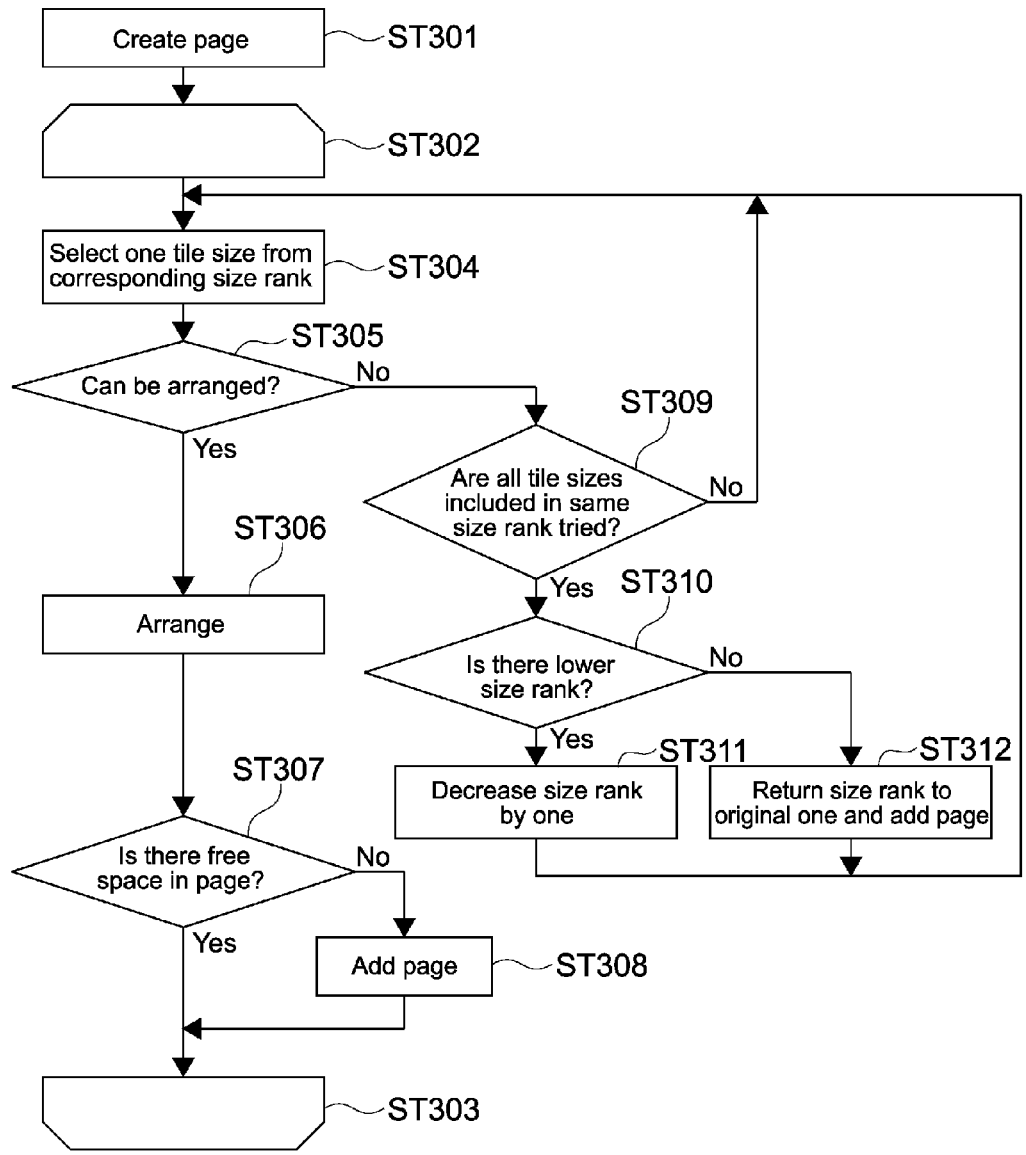
FIG. 13 is a flowchart showing in detail an arrangement process shown in FIG. 7.
Figure 14:
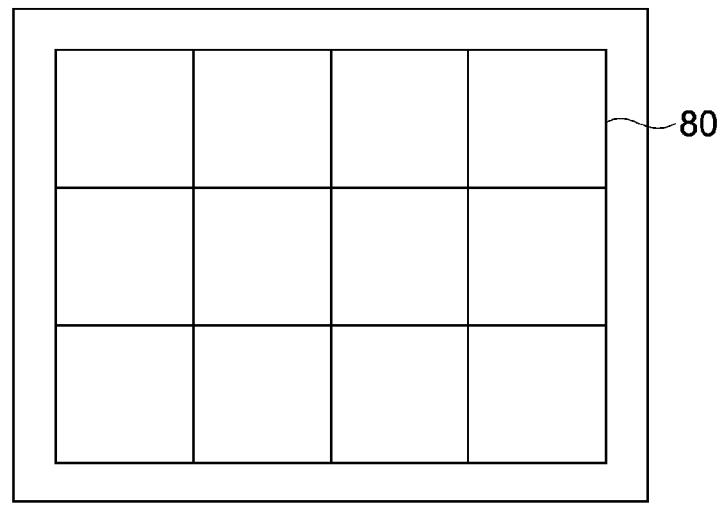
FIG. 14 is a diagram showing an example of a page created for displaying the plurality of pieces of content.

FIG. 13 is a flowchart showing in detail the arrangement process. First, a page for displaying a plurality of pieces of content is created (Step 301). In this embodiment, the page is created as an arrangement place of the tile 51. As shown in FIG. 14, a page 80 includes a grid with arbitrary rows and columns. A plurality of pages 80 may be created. For example, in the case where it is difficult to further arrange the tile 51 in the page 80, a new page 80 may be added.

Figure 15:
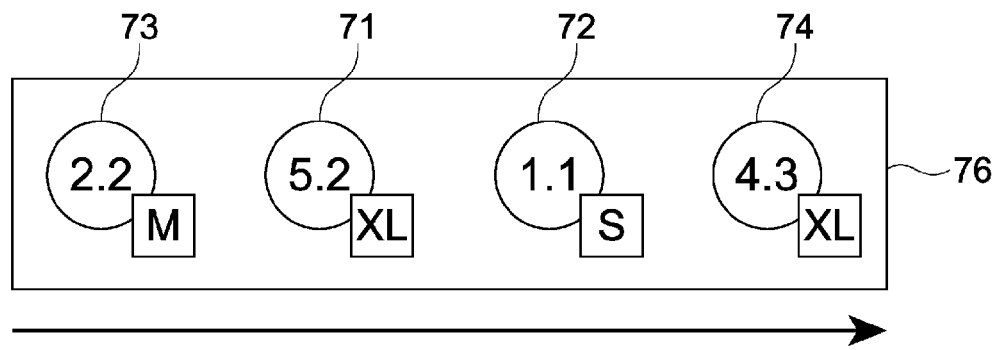
FIG. 15 is a diagram showing an example of a score calculated based on the parameters.

On the calculated scores, which are included in the column 70, the following process is repeatedly performed (Steps 302 and 303). Here, a description will be made by using the four scores 71 to 74 shown in FIG. 15. The scores 71 to 74 are regarded as a data column 76 to which the size ranks 50 are allocated. In the data column 76, the four scores 71 to 74 are sorted out in advance based on a predetermined arrangement condition, i.e., condition of the order A described above. For example, the four scores 71 to 74 are arranged in order of the name of content or time and date of posting.

As described above, in this embodiment, the arrangement condition is set in advance, and the scores 71 to 74 are arranged based on the arrangement condition. It should be noted that the arrangement condition may be appropriately set by a user's instruction.

The timing when the scores 71 to 74 are sorted out is not limited. The scores 71 to 74 may be sorted out after the size ranks 50 are allocated to the scores 71 to 74. The scores 71 to 74 may be sorted out before the size ranks 50 are allocated to the scores 71 to 74.

For the score 73 to be arranged first, one tile size 60 is selected from the size rank M associated with the score 73 (Step 304). The method of selecting one tile size 60 is not limited. The tile size 60 may be randomly selected. Alternatively, priority may be set, and the tile size 60 may be selected based on the priority. Here, it is assumed that the tile size 62 selected.

Whether or not the selected tile size 62 can be arranged in the page 80 is determined (Step 305). In this embodiment, a plurality of pieces of content are sequentially arranged from top left to bottom right of the page 80. Therefore, also in the determining process, searching is performed from top left to bottom right of the page 80, and whether or not the selected tile size 62 can be arranged is determined.

In the case where it is determined that the tile size 62 can be arranged (Yes in Step 305), the tile size 62 is arranged in the page 80 (Step 306). In this embodiment, as shown in FIG. 16, the tile size 62 is arranged at the top left of the page 80 as the first tile size 60.

Whether or not there is a free space in the page 80 is determined (Step 307). In the case where there is no free space (No in Step 307), a new page 80 is added (Step 308), and the subsequent tile size 60 is arranged in the new page 80. In the case where it is determined that there is a free space (Yes in Step 307), the arrangement process is repeated on the next score 71.

For the next score 71, one tile size 60 is selected from the size rank XL (Step 304). For example, it is assumed that the tile size 66 including 3 rows and 3 columns is selected. Whether or not the tile size 66 can be arranged is determined (Step 305).

Figure 16:
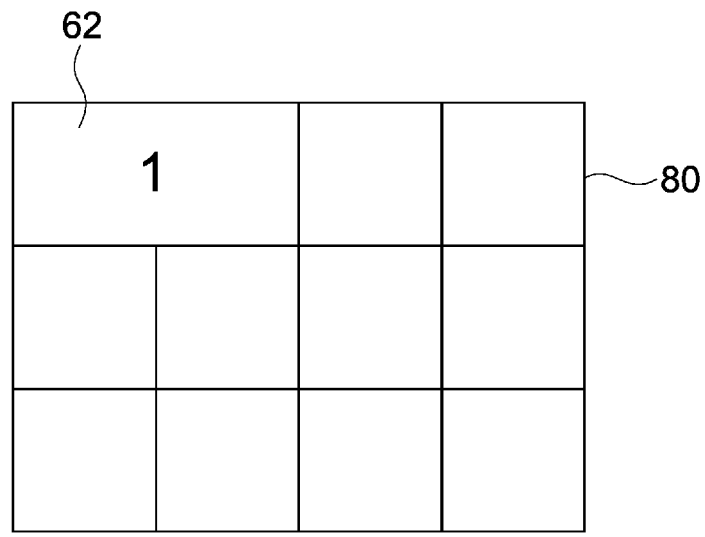
FIG. 16 is a schematic diagram showing a page in which a first tile size is arranged.

As shown in FIG. 16, the page 80 has no free space where the tile size 66 can be arranged. Therefore, the arrangement is determined not possible (No in Step 305), and whether or not all of the tile sizes 60 included in the size rank XL are selected and tried to be arranged is determined (Step 309). In the case where it is determined that all of the tile sizes 60 are not tried to be arranged (No in Step 309), a different tile size 60 included in the size rank XL is selected.

Figure 17:
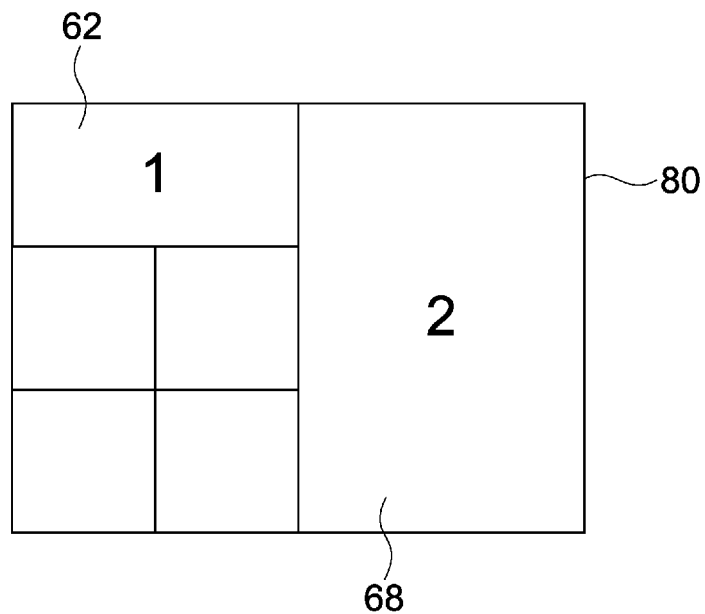
FIG. 17 is a schematic diagram showing a page in which a second tile size is arranged.

For example, it is assumed that the tile size 68 including 2 rows and 3 columns in the size rank XL is selected as the different tile size 60. The tile size 68 can be arranged in the page 80. Therefore, as shown in FIG. 17, the tile size 68 is arranged as the second tile size 60.

As described above, in this embodiment, whether or not arrangement of pieces of content is possible is determined for each of the pieces of content, and the display condition (tile size 60) set for the content that is determined not possible to be arranged is changed. As in the case of changing setting of the second tile size 60, a different tile size 68 in the size rank XL including the tile size 66 that is set first may be set. Accordingly, it is possible to change the display size while maintaining the association of the size rank 50 with the importance.

Figure 18:
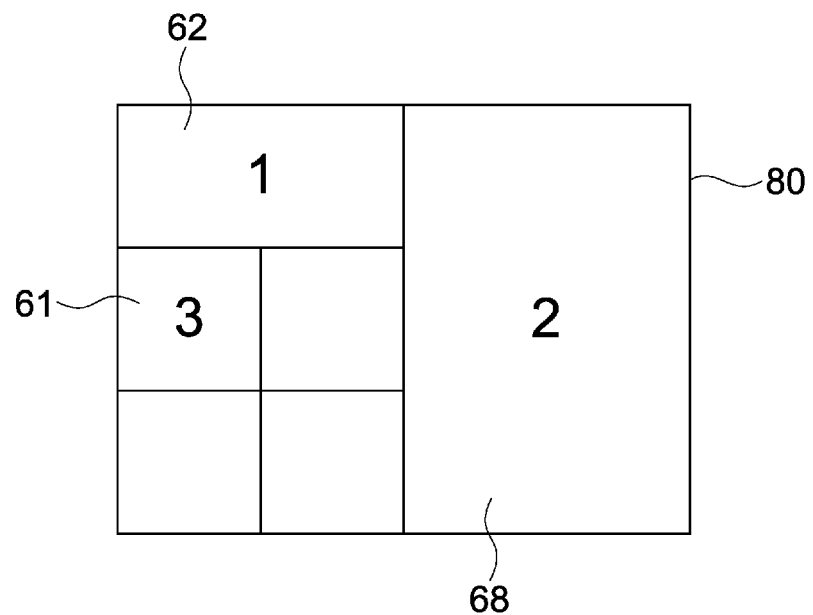
FIG. 18 is a schematic diagram showing a page in which a third tile size is arranged.

Referring back to Step 304, for the next score 72, the tile size 61 is selected from the size rank S (Step 304). Then, as shown in FIG. 18, the tile size 61 is arranged in the page 80 as the third tile size 60 (Steps 305 and 306).

Finally, for the score 74, one tile size 60 is selected from the size rank XL. However, in the size rank XL, there is no tile size 60 that can be arranged in the page 80 shown in FIG. 18. Therefore, whether or not all of the tile sizes 60 included in the size rank XL are tried to be arranged is determined Yes (in Step 309), and the process proceeds to Step 310.

In Step 310, whether or not there is a lower size rank 50 is determined. Here, the size rank 50 including a smaller tile size 60 is the lower size rank 50. Therefore, the size rank S is the lowest size rank 50.

Because there are size ranks 50 lower than the size rank XL, the process proceeds from Yes in Step 310 to Step 311, and the rank of the size rank 50 is decreased by one. In this embodiment, the size rank is decreased to the size rank L, and the selection of one tile size 60 is again performed from the size rank L (Step 304).

Also in the size rank L, there is no tile size that can be arranged in the page 80 shown in FIG. 18. Therefore, the process again proceeds to Step 311, and the rank of the size rank 50 is decreased by one. Then, the selection of one tile size 60 is again performed from the size rank M (Step 304).

Figure 19:
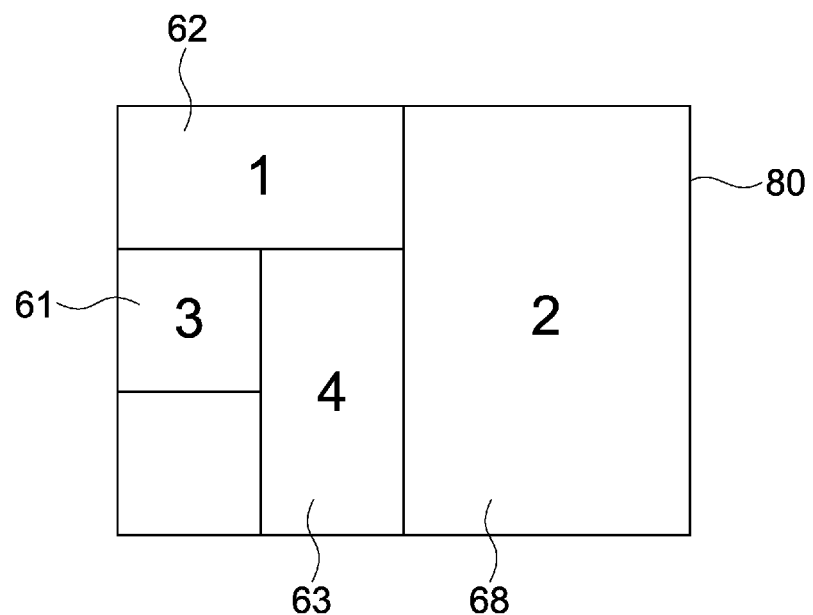
FIG. 19 is a schematic diagram showing a page in which a fourth tile size is arranged.

It is assumed that the tile size 63 is selected from the size rank M. Because the tile size 63 can be arranged in the page 80, as shown in FIG. 19, the tile size 63 is arranged as the fourth tile size 60. It should be noted that also the tile size 62 included in the size rank M can be arranged. However, the process of selecting the tile size 63 may be performed so that the selection meets the arrangement condition that the tile sizes are sequentially arranged from top left to bottom right.

As described above, as the change of the display condition (tile size 60) that is determined not possible to be arranged, a tile size 60 included a different size rank 50, which differs from the size rank 50 including the tile size 60 that is set first, may be set. Accordingly, it is possible to display the plurality of pieces of content while flexibly reflecting the arrangement condition and the display condition.

It should be noted that in Step 310, it is determined that there is no lower size rank 50 (No in Step 310), the size rank 50 is returned to be the originally-associated size rank 50 and a new page 80 is added (Step 312). In the added page 80, the arrangement of content is performed by using the tile size 60 included the original size rank 50. It should be noted that in the case where there is no lower size rank 50 from the beginning, the size rank 50 is not returned.

Figure 20:
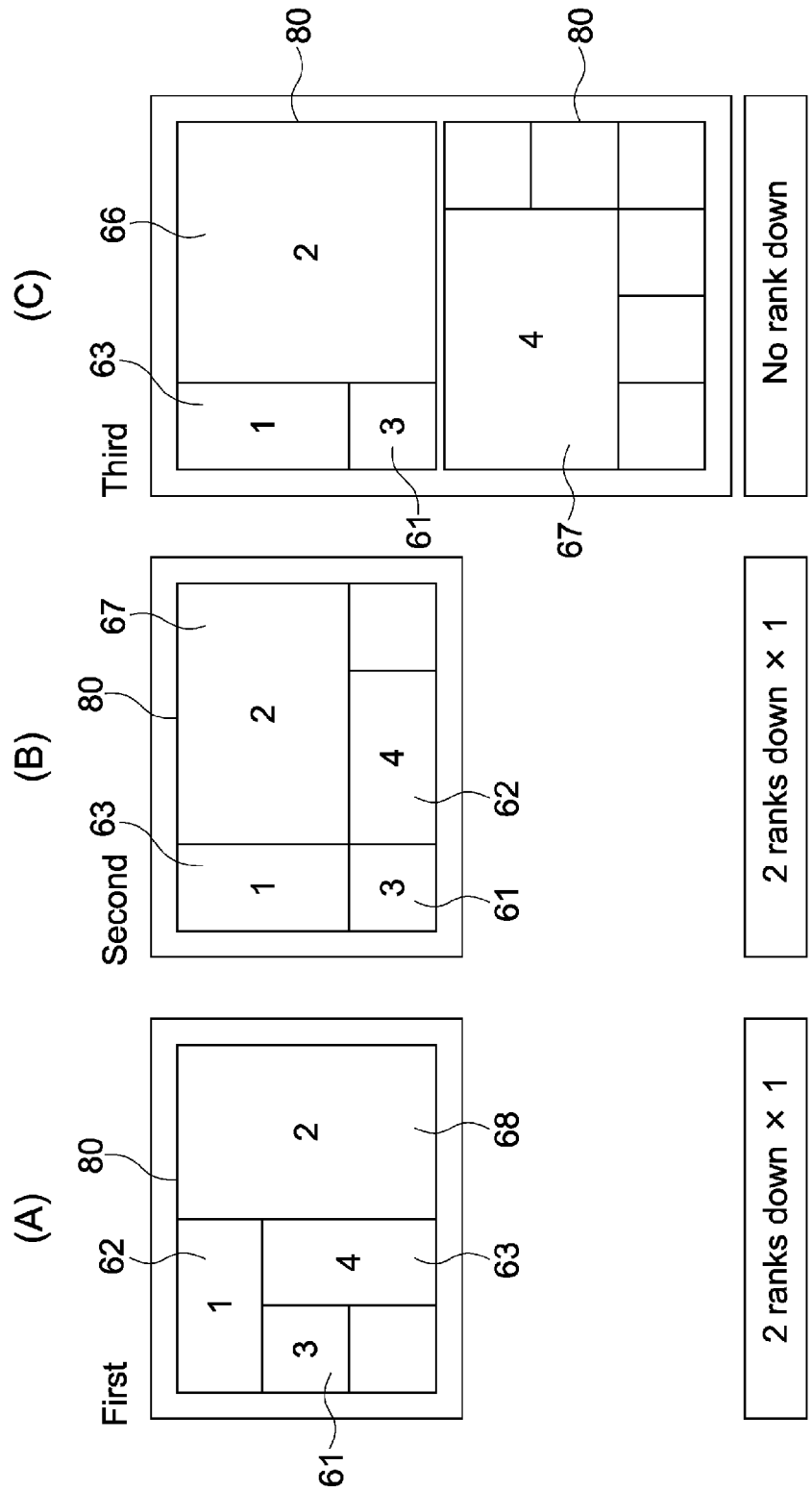
FIG. 20 are each a diagram for explaining an arrangement process that is repeatedly performed.

It should be noted that the arrangement process described above may be repeatedly performed more than once. FIG. 20 are each a diagram for explaining the repeated arrangement process.

When the tile size 60 is selected for each score, a plurality of selecting methods can be used. For example, for the score 73, the tile size 62 in the size rank M is selected. However, the tile size 63 may be selected to be arranged as the first tile size 60. The selection of the second and subsequent tile sizes 60 is performed in the same way. If a different tile size 60 is selected, the arrangement of the tile size 60 differs. Therefore, a plurality of arrangement processes are repeatedly performed, the arrangement is evaluated, and the arrangement process to be actually performed may be selected based on the evaluation result.

FIG. 20A shows the result of the arrangement process described with reference to FIG. 16 to FIG. 19. It is assumed that the result of arrangement is calculated as the first result of arrangement. FIGS. 20B and 20C show the result of the second arrangement process and the result of the third arrangement process, respectively. As described above, it is assumed that a plurality of arrangement processes are performed, and the results are calculated.

In each arrangement process, the number of times the process of decreasing the size rank 50 shown in Step 310 of FIG. 13 has been performed (referred to as rank down) is counted. In the first arrangement process shown in FIG. 20A, when the tile size 63 is set as the fourth tile size, the rank down is performed twice. Therefore, 2 ranks down×1 is counted. Also in the second arrangement process shown in FIG. 20B, when the tile size 62 is set as the fourth tile size, the rank down is performed twice. Therefore, 2 ranks down×1 is counted.

In the third arrangement process shown in FIG. 20C, no rank down is performed. On the other hand, in the third arrangement process, a new page 80 is added. When the arrangement processing is evaluated, the counted rank down may be set as a penalty. This is because the rank down means that the size rank is not associated with the score. Then, the arrangement process with the smallest number of penalties and the highest evaluation may be selected. It should be noted that addition of a new page may be evaluated.

By the arrangement method according to this embodiment, it is possible to perform the arrangement process that meets, as much as possible, the condition that the plurality of pieces of content are tightly arranged while the sizes obtained based on the display condition (order B) are sorted out based on the arrangement condition (order A) (exception may be made). As a result, it is possible to display a list of pieces of content so that browsing can be efficiently performed.

Moreover, because the arrangement is performed for each page 80, arrangement order based on the arrangement conditions of the pages 80 is assured. For example, in the case where data is arranged in chronological order (in order of new data), only data newer than that in the second page is arranged in the first page. Moreover, in the case where arrangement with the allocated size rank 50 in the page 80 is not possible, it is possible to increase the filling rate in the page 80 by gradually decreasing the rank of the size rank 50.

Figure 21:
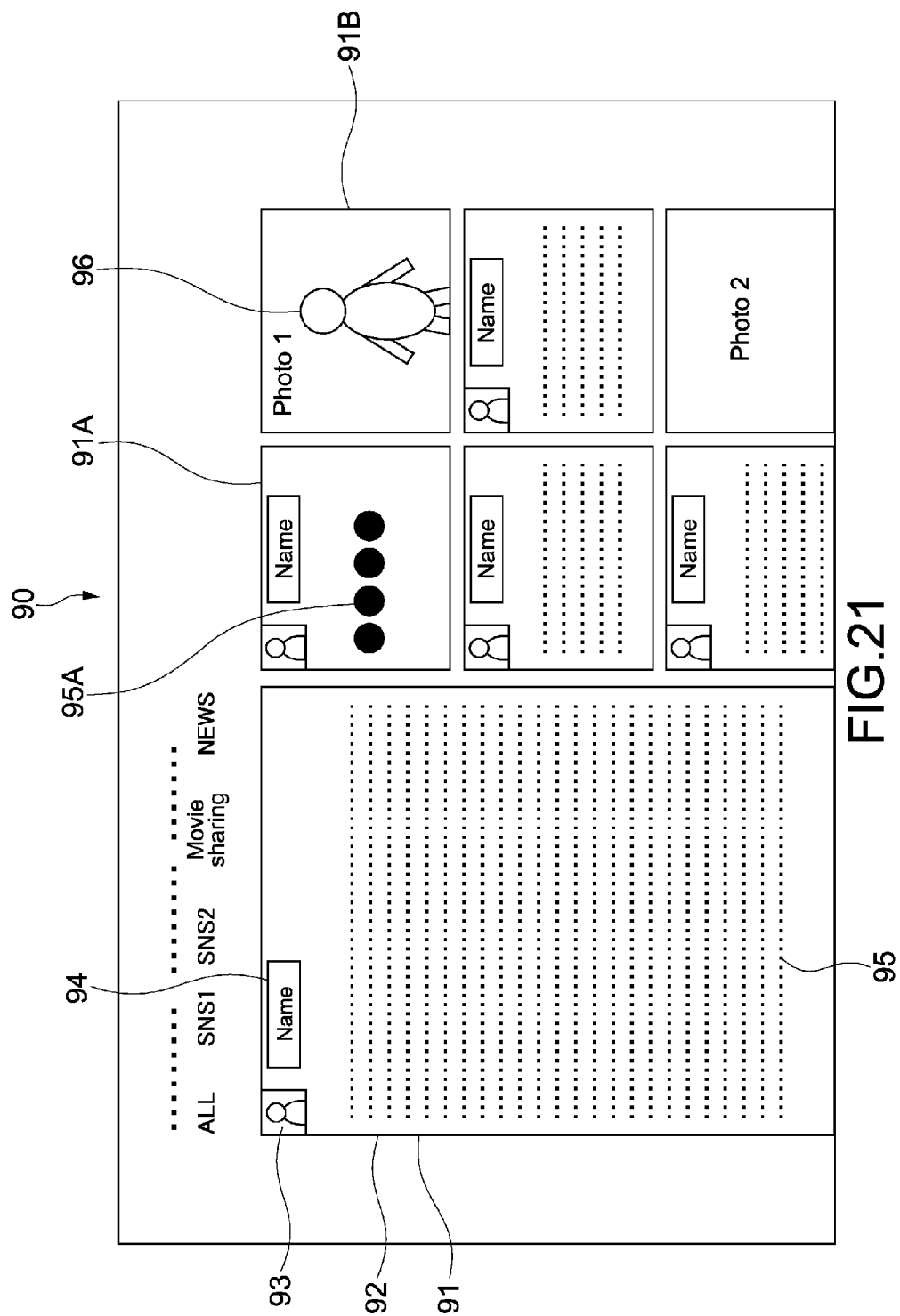
FIG. 21 is a diagram for explaining addition of a design element shown in FIG. 7.

With reference to the flowchart shown in FIG. 7 again, a design element for displaying a list of the plurality of pieces of content is added (Step 106). FIG. 21 is a diagram for explaining the addition of a design element. In a list display 90 shown in FIG. 21, a comment posted to SNS, photograph data, and the like are displayed as a plurality of pieces of content 91 so as to have a size in unit of tile.

Based on the result of arrangement performed in Step 105, display information for displaying each of the plurality of pieces of content 91 is generated, and a list of the display information is displayed. When the display information is generated, in this embodiment, "color extraction", "automatic adjustment of a text size", and "adaptive trimming" are performed as the addition of a design element.

In the color extraction, a background color of a tile 92 that represents the content 91 is set based on an image of an avatar icon. As shown in FIG. 21, in the comment posted to SNS, an avatar icon 93 is displayed as an image that represents the corresponding user. The avatar icon 93 is individually set by the user, and various images such as an image of the face of the user, an image of a favorite landscape, and an image of a pet owned by the user are used.

In this embodiment, the image of the avatar icon 93 is analyzed, and a color similar to a main color in the image is used as the background color of the tile 92. Accordingly, for example, it is possible to easily recognize a comment posted from the same user. Moreover, the design is improved. As a result, it is possible to efficiently browse the plurality of pieces of content 91.

For example, as the background color of the tile 92, a plurality of colors are prepared in advance, and a color most similar to the color of the avatar icon 93 may be appropriately selected. It should be noted that setting of the background color of the tile 92 is not limited to a case where the setting is performed based on the analysis result of the image of the avatar icon 93. A color associated with a user name 94 or the like may be randomly displayed. Also in this case, because the same user is displayed by the tile 92 having the same background color, browsing can be efficiently performed.

The automatic adjustment of a text size is a process of automatically adjusting a text size for display based on the length of a text 95 and the size of the tile 92 in a comment posted to SNS or the like. For example, in a content 91A, which is a comment posted to SNS shown in FIG. 21, a text 95A includes four characters. In this case, if the text 95A is displayed in the same text size as another content 91 or the like, a large free space is created. In order to prevent this, in this embodiment, the text size of the text 95A is set large (black dot represents one character). Accordingly, the design is improved, and it is possible to easily recognize the text 95A.

The adaptive trimming is a process performed when photograph data is displayed as the content 91. Specifically, on the photograph data, image analysis such as face recognition, object recognition, and feature amount extraction is performed. Based on the analysis result, an area of interest is calculated, and the image is trimmed so that the area is held as much as possible. For example, in FIG. 21, a content 91B of photograph data is displayed. When the content 91B is displayed, the adaptive trimming is performed and a part 96 of a person is calculated as the area of interest. Then, the image is trimmed so that the part 96 of a person, which is the area of interest, is displayed.

As described above, in this embodiment, when a list of a plurality of pieces of content is displayed based on the arrangement condition and the display condition, the addition of a design element is performed. Accordingly, browsing can be efficiently performed. It should be noted that not only the processes described above but also a process for improving the design or efficiency of browsing may be appropriately performed.

With reference to the flowchart of FIG. 7 again, the entire view displaying a list of a plurality of pieces of content is displayed (Step 107). The entire view corresponds to, for example, the list displays 10 to 30 and 90 shown in FIGS. 4 to 6, and 21. For example, a user browses the entire view while scrolling the screen by using the input unit 207 such as a touch panel.

In the case where a user's instruction or the like is received, updating of the list display is determined (Step 108). For example, the updating process is determined when an updating button is pressed or an operation of scrolling to the lower end of the screen or the like is input. The operation for updating may be set in advance, and the type of the operation is not limited. Alternatively, the updating process may be automatically determined when a predetermined time period has been elapsed. When the updating process is determined, the process returns to Step 102 and the process of displaying a list of pieces of content is again performed.

In the case where a user presses the individual tile 92 (content 91) (Step 109), detailed data of the content 91 that is displayed in the tile 92 is obtained (Step 110). Then, a detailed view is displayed (Step 111).

Figure 22:
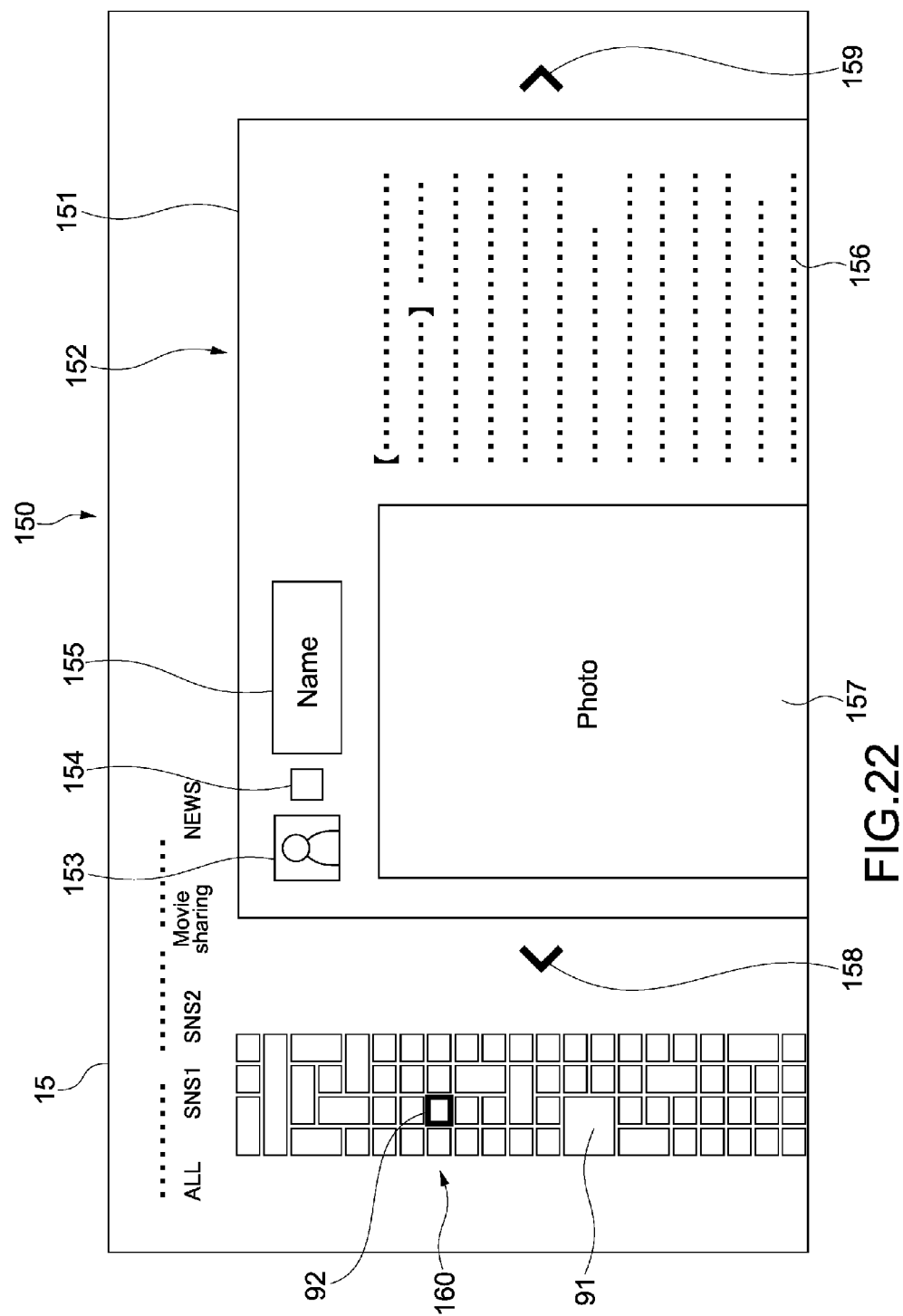
FIG. 22 is a schematic diagram showing an example of a detailed view.

FIG. 22 is a schematic diagram showing an example of a detailed view 150. Here, the tile 92 of a comment posted to SNS is pressed, and a detailed data 151 of the content is displayed. The center and left side of the screen 15 correspond to a content display area 152. Here, an avatar icon 153 of a user, a logo 154 representing the type of SNS, and a user name 155 of the user are displayed. Moreover, a text 156 that is input by the user and an attached photograph 157 are displayed.

The detailed data 151 is obtained through, for example, the Internet 5. Alternatively, the detailed data 151 is stored in the storage unit 208 or the like in advance, and may be appropriately retrieved in the obtaining step of the detailed data 151 (Step 110). In the case where the content is image data or the like stored in the storage unit 208 or the like in advance, also the detailed data 151 is retrieved from the storage unit 208 or the like, naturally.

On the left side and right side of the detailed data 151 in the content display area 152, a left button 158 and a right button 159, which are shown by arrows, are displayed, respectively. When the left button 158 or the right button 159 is pressed, the detailed view 150 transits to a different detailed view 150 of a different content 91 adjacent to the content 91 that is displayed in detail. Accordingly, it is possible to efficiently browse the detailed display of the content 91 based on the arrangement condition.

On the left side of the content display area 152, a reduced entire image 160 obtained by reducing the entire view is displayed. The tile 92 in the reduced entire image 160, which is currently displayed in detail, is displayed in the highlight color. Accordingly, the user can definitely understand which portion is being viewed in the entire view, so that browsing can be efficiently performed. In the case where the left button 158 or the right button 159 is pressed, also the position of the highlight display is changed.

By directly pressing (e.g., tapping or clicking) a different tile 92 in the reduced entire image 160, the detailed view may directly transit to the detailed view 150 of the pressed tile 92. Specifically, the detailed data 151 of the pressed tile 92 is displayed in the content display area 152. Accordingly, it is possible to browse a desired content 91 in detail with a simple operation in a short time.

If a return button (not shown) is pressed, the view returns from the detailed view 150 to the entire view (Step 112).

As described above, in the information processing apparatus 200 according to this embodiment, the arrangement condition for arranging the plurality of pieces of content 91 is set. Moreover, importance is calculated for each of the plurality of pieces of content 91, and the display condition is set for each of the plurality of pieces of content 91 based on the importance. The plurality of pieces of content 91 are arranged based on the arrangement condition and the display condition set for each of the plurality of pieces of content 91. As a result, it is possible to display the plurality of pieces of content 91 so that browsing can be efficiently performed.

For example, the display size obtained based on the importance is set as the display condition. Accordingly, the plurality pieces of content are displayed so that their display sizes are different from each other depending on the importance while the plurality pieces of content are arranged in a predetermined arrangement condition. As a result, it is possible to display the plurality of pieces of content 91 so that browsing can be efficiently performed.

For example, as the method of displaying a list of a plurality of pieces of data, a method of displaying a list of names or the like of pieces of content in one dimension, or a tile display method, i.e., a method of arranging tiles having the same size in two dimension can be considered. For example, tiles or the like are often sorted out in order of attribution such as a name and date, and a user can sequentially browse data in regular flow of line of sight, e.g., from top to bottom or from top left to bottom right. However, all pieces of data are dealt with equally and displayed in the same size. Therefore, a user has to determine whether or not each piece of data is information necessary for the user by sequentially viewing a displayed character string or a displayed icon.

On the other hand, in the display method according to this method, the display condition is set based on a parameter of each piece of content and in accordance with the arrangement condition obtained based on a different parameter such as a name and a time and date of posting. For example, in the case where the display size is set as the display condition, the setting corresponds to visualization of a parameter, and it is possible to more efficiently find desired content. Moreover, even in the case where browsing is vaguely performed without a clear purpose as in browsing of content in a social network, it is possible to more efficiently collect and browse information by displaying content, which is to be focused on by the user, in relatively large size while sorting out all of the pieces of content in chronological order. Specifically, browsing/search performance is improved, as compared with the simple one-dimensional display or two-dimensional arrangement described above.

Modified Example

Embodiments of the present disclosure are not limited to the above-mentioned embodiments and various modifications can be made. For example, FIGS. 23, 24, 25, and 26 are each a diagram showing another example of the entire view by the display method according to this embodiment.

Figure 23:
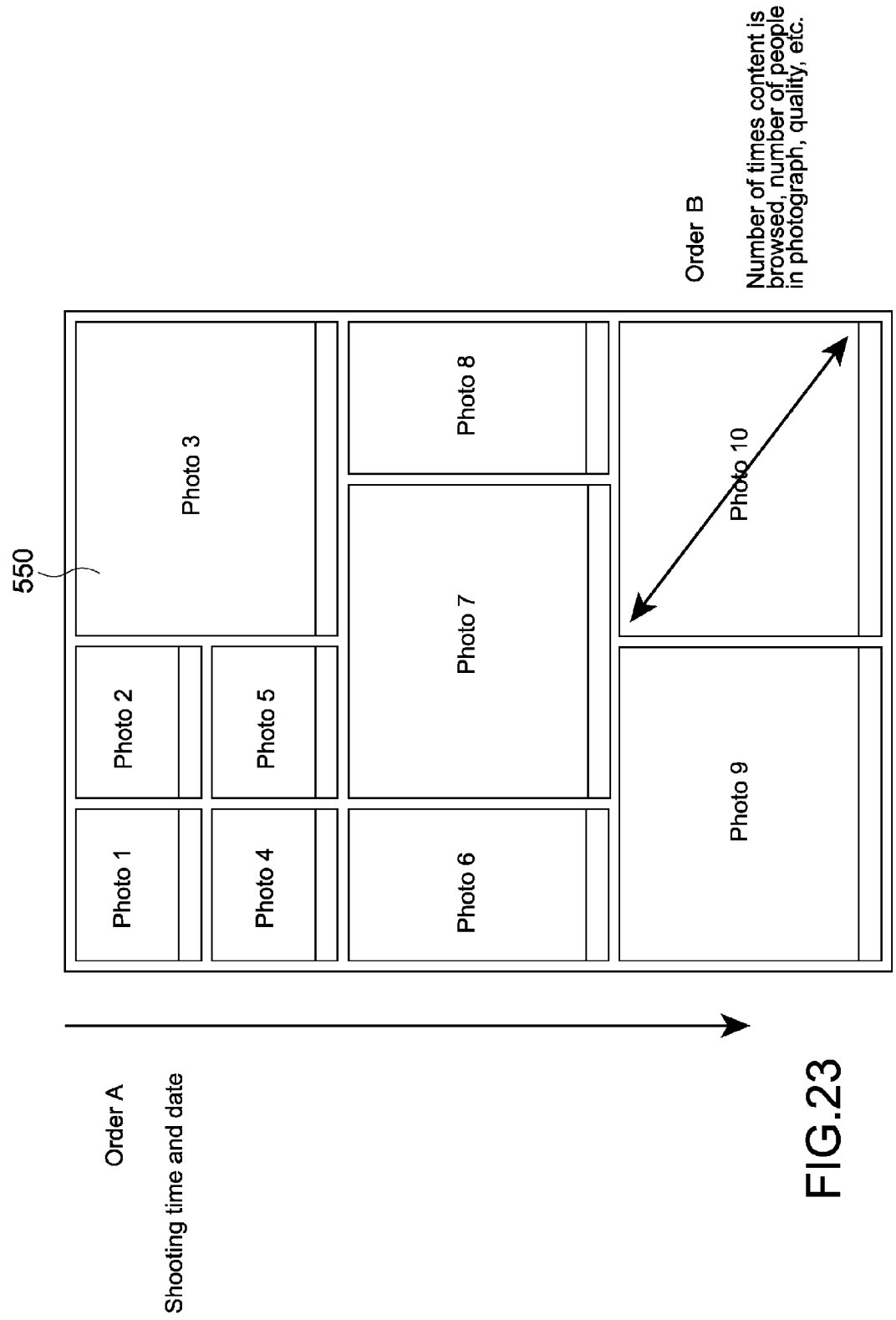
FIG. 23 is a diagram showing an example of the entire view by the display method according to this embodiment.

FIG. 23 is a diagram showing a case where a list of photograph data is displayed as a plurality of pieces of content 550. Here, as the arrangement condition (order A), arrangement in order of a shooting time and date is set. Moreover, as the display condition (order B), the display size obtained based on the importance is set. As the parameter for calculating the importance, for example, the number of times the content is browsed, the number of people in a photograph, the quality of a photograph, or the like is used, as shown in the table of FIG. 8.

Figure 24:
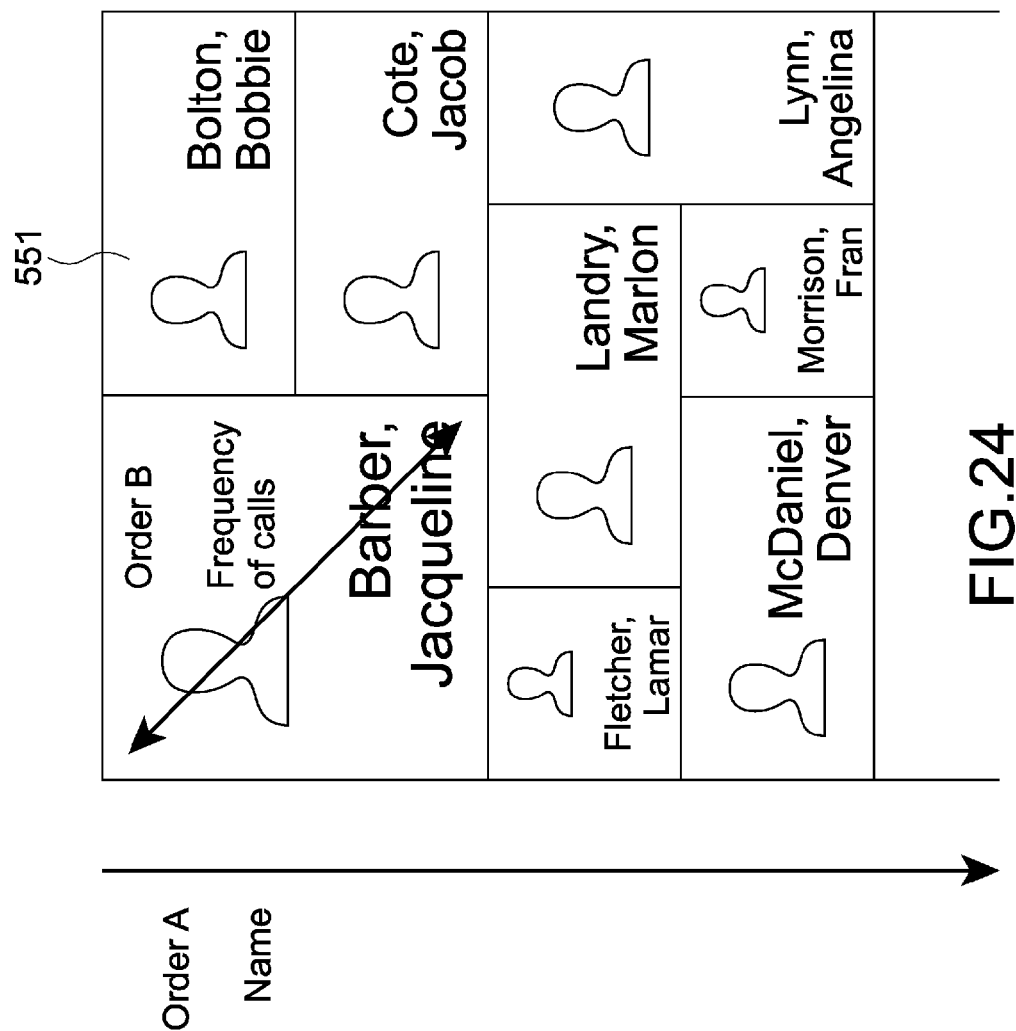
FIG. 24 is a diagram showing another example of the entire view by the display method according to this embodiment.

In FIG. 24, as a plurality of contents 551, contact information kept in a telephone book is shown. Here, as the arrangement condition (order A), arrangement in order of the name is set. Moreover, as the display condition (order B), the display size obtained based on the importance is set. As the parameter for calculating the importance, for example, a frequency of calls is used, as shown in the table of FIG. 8.

Figure 25:
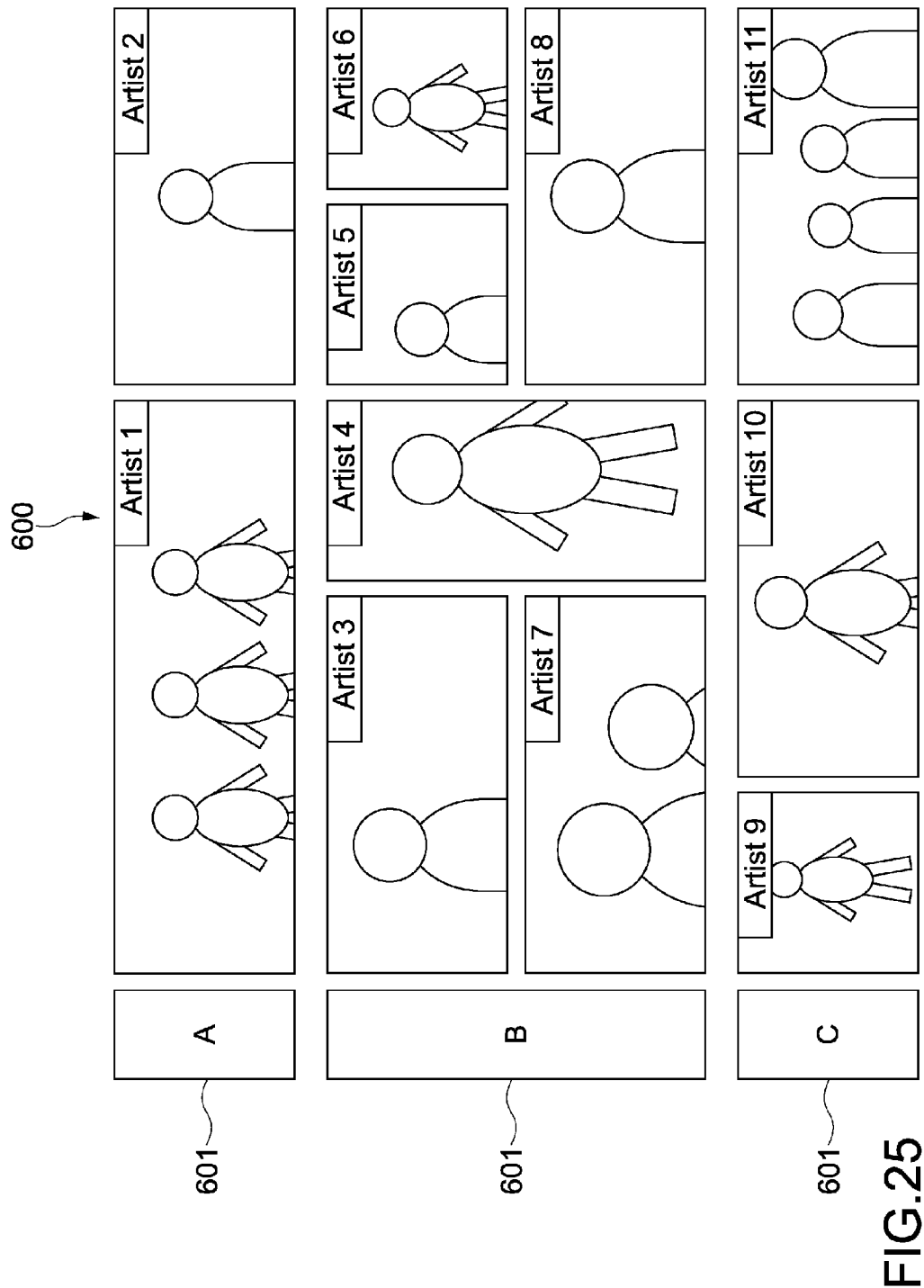
FIG. 25 is a diagram showing still another example of the entire view by the display method according to this embodiment.

FIG. 25 is a diagram showing a modified example of the listing of the pieces of music content shown in FIG. 4. In an entire view 600 shown in FIG. 25, in the case where an initial of the artist name is changed (e.g., from A to B), a new grid 601 is defined as separation. As described above, a grid is not necessarily generated for each page, and a new grid 601 may be appropriately added based on a predetermined parameter such as a name and a time and date.

Figure 26:
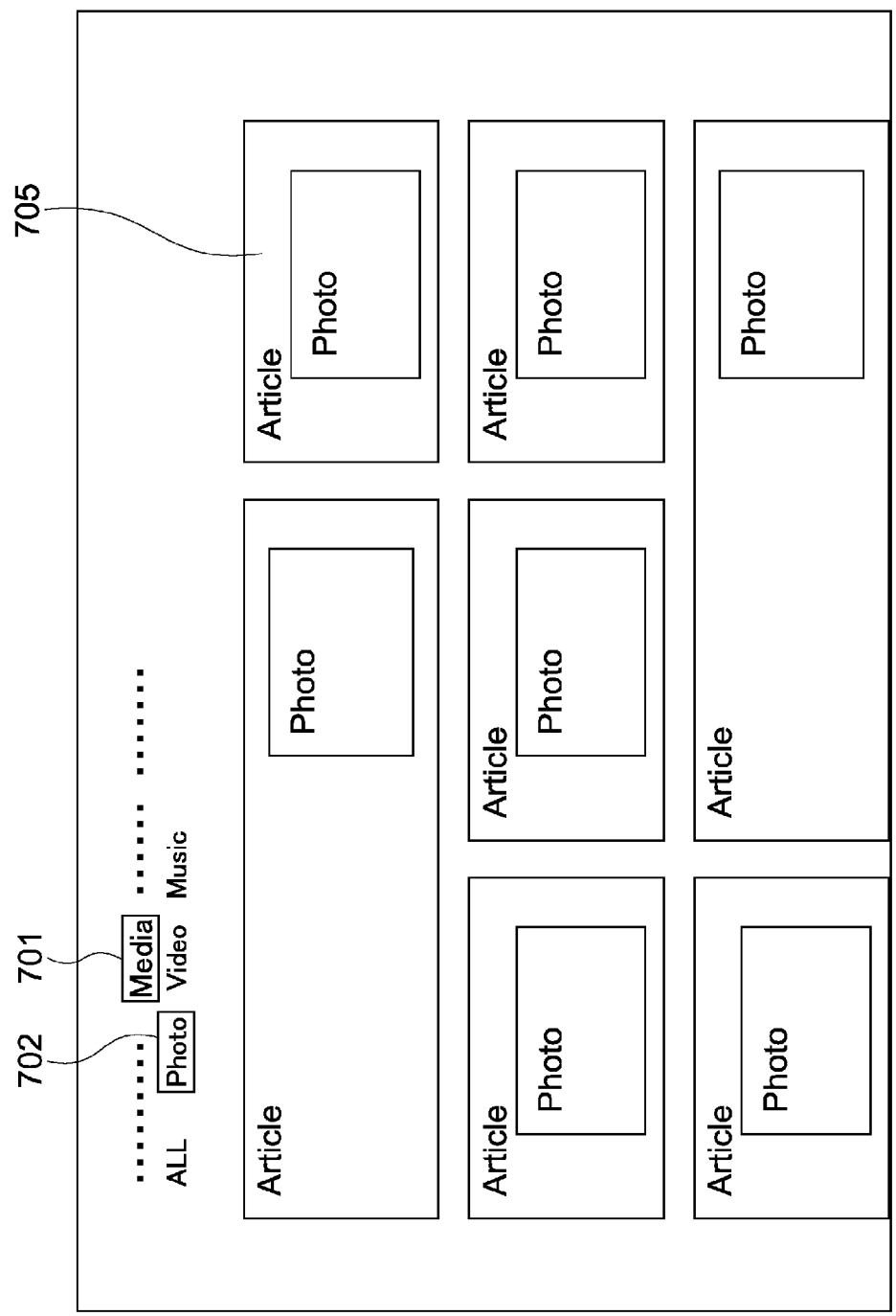
FIG. 26 is a diagram showing still another example of the entire view by the display method according to this embodiment.

FIG. 26 is a diagram showing listing of a plurality of pieces of content selected based on a predetermined condition. Here, a "Media" button 701 on top left of FIG. 26 is pressed. As a result, below the "Media" button 701, "ALL", "Photo", "Video, "Music" buttons 702 are displayed. For example, the "photo button" 702 is pressed, as a plurality of contents 705, contents 705 to which photographs are attached are selected and a list of the contents 705 are displayed. The contents 705 are appropriately arranged based on the arrangement condition and the display condition. As described above, the plurality of contents 705 to be displayed may be selected based on, for example, data attached to the contents 705. Only the contents 705 having media (Photo, Video, Music) may be filtered, and the contents 705 may be filtered for each media type (e.g., Photo).

Figure 27:
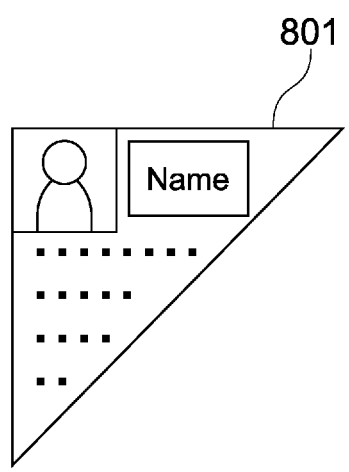
FIG. 27 is a diagram showing a modified example of content displayed in the entire view.

FIG. 27 is a diagram showing a modified example of content displayed in the entire view. As shown in FIG. 27, the shape of a content 801 to be displayed, or the shape of a tile that is a unit for the content 801, is not limited. As shown in FIG. 27, the content 801 may be displayed in a triangular shape. In addition, the content 801 may be displayed in a circular shape, a polygonal shape, or the like.

In the above description, whether or not arrangement is possible is determined for each pieces of content for which the display size is set, and the display size set for the content is changed in the case where the arrangement is determined not possible. For example, in the case where the arrangement of the content is determined not possible, the display size of different content that is already arranged may be changed. Also the determination of whether or not a plurality of pieces of content can be arranged is not limited to a case where the determination is performed for each piece of content to be arranged.

In the above description, the importance is calculated based on at least one parameter, and the display condition is set based on the importance. The importance to be calculated is not limited to a piece of importance, and a plurality of pieces of importance may be calculated. Then, based on the plurality of pieces of importance, a plurality of display conditions may be set for each piece of content.

For example, in the case where the plurality of pieces of content are comments posted to SNS, first importance is calculated based on the number of times the content is browsed. Moreover, second importance is calculated based on the length of a text of the posted comment. Then, based on the first importance, the display size is set as a first display condition. Moreover, based on the second importance, the color of the content is set as a second display condition. In this case, when list display is performed, the plurality of pieces of content are displayed with the display size set based on the first importance, and the color set based on the second importance, in order of a time and date of posting, for example. As described above, based on a plurality of pieces of importance, a plurality of display conditions may be set. Accordingly, it is possible to efficiently browse a plurality of pieces of content.

In the above description, the example in which a plurality of pieces of content are arranged in two dimension has been described. However, the display method according to this embodiment may be applied to a case where a list of the plurality of pieces of content is displayed in one dimension. For example, as the display condition of each piece of content, the display size, color, or the like may be set based on the importance for each piece of content.

In the above description, the calculated score section is equally divided, and a plurality of size ranks are associated with the divided sections. Specifically, a plurality of scores are relatively evaluated, and the display size is set. Therefore, even if the calculated scores are generally large or small, the value of the scores is relatively determined. Then, the display size obtained based on the score is set.

Alternatively, the display size may be set based on an absolute value of the score. For example, a score value corresponding to a predetermined display size may be set as the absolute value. In this case, if the calculated scores are generally small, also the display sizes of pieces of content to be listed are generally small. On the other hand, if the calculated scores are generally large, also the display sizes of pieces of content to be listed are generally large. With such display, a user can understand the overall importance or the like of the pieces of content at this time.

In the above description, by the information processing apparatus 200 used by the user, the above-mentioned processes such as obtaining of the content, calculation of the importance, setting of the display size, and displaying of the entire view are performed. However, all or a part of the processes may be performed by the server 300 connected to the information processing apparatus 200 through the Internet 5. For example, the processes to the calculation of the importance may be performed by the server 300, and the subsequent processes may be performed by the information processing apparatus 200. Alternatively, the above-mentioned processes are performed in a server, and display information on the entire view may be transmitted to the information processing apparatus 200. In this case, the server corresponds to the information processing apparatus according to this embodiment.

The program executed by the information processing apparatus may be a program that performs time series processes in the above-mentioned order or a program that performs the processes in parallel or at necessary timing when being called, for example.

In addition, techniques relating to the display method according to this embodiment will be described. For example, an application is installed for performing the display method according to this embodiment. Then, it is assumed that by logging in the application, the listing of a plurality of pieces of content described above is performed. In this case, it may be possible to log in the application with OpenID. For example, in the case where a comment posted to SNS or the like is displayed as content, an ID for logging in the SNS may be used as it is. In the case where a plurality of pieces of SNS are used, any ID of a plurality of log-in IDs may be used. Accordingly, it is unnecessary to create a new log-in ID.

For example, a plurality of arrangement conditions (order B) may be set, and the arrangement conditions may be alternately switched. For example, display in order of a time and date of posting and display in order of a name of a sender may be mutually switched to each other.

Moreover, as a normal mode, a plurality of comments are displayed in chronological order. Moreover, as a smart mode, an article suitable for a user's taste may be displayed on the upper portion of the screen. For example, in the smart mode, content having high importance and a large display size is arranged on the upper portion of the screen to be displayed. As described above, based on the importance, the arrangement condition may be changed.

Out of the plurality of pieces of content, content bookmarked by the user may be selected and a list of the content may be displayed. Also in this case, the importance may be appropriately calculated, and the display condition may be set for each of the pieces of content. For example, by pressing a bookmark display button or the like, a list display screen of the bookmarked content is displayed. Dropping of bookmarks or the like may be performed.

Obtained content may be locally stored, i.e., stored in a storage unit or the like, and the content may be browsed after log-in or at the time of off-line.

In the case where the content is a comment posted to SNS or the like, a reply to the comment or adding the comment to favorites may be performed. Not only the adding to favorites but also various other activities may be performed. For example, the input may be performed in the detailed view shown in the figure, or in the entire view.

In the case where the content is a movie or the like uploaded into movie sharing service, by selecting (single-tapping) the content in the entire view, the movie may be in-line reproduced. In the case where another selecting method such as double clicking is performed, the movie may be reproduced in full screen display (detailed view).

In the case where the content is music content, an operation such as reproduction and stopping may be performed in any of the entire view and the detailed view. Moreover, even if the screen transits to the detailed view or the like of different content during reproduction of the music content, the reproduction of the music content may be continued.

In the case where the content is a comment posted to SNS or the like, by tapping the avatar icon of the user or the user name, detailed information such as the profile of the user may be displayed.

In the case where content such as a movie, music, and a photograph, which can be reproduced, is selected, the content is reproduced in the application according to this embodiment in the detailed view or the like. When the reproduction is finished, for example, on the lower side of the content display area 152 shown in FIG. 22, a plurality of pieces of content of the same or related media may be arranged. Accordingly, it is possible to sequentially browse the pieces of content of the media.

Photograph content or the like may be shared by the users.

For reproducing movie content, an embedded player may be used, or a video tag may be used.

In the case where the content is a news article distributed via RSS (RDF Site Summary) or the like, a predetermined news article may be selected and a list of the news articles may be displayed in the entire view. For example, there are a plurality of modes for selecting a news article, and a user selects one of the modes, thereby displaying a list of the news articles corresponding to the selected mode. Examples of the mode include a mode for displaying a list of recommended feeds selected by a service manager. For example, key words are arranged on the left side of the screen, and feeds and posts (news article) related to the keywords are displayed. Other examples of the mode include a mode for displaying a list of news articles based on ranking. In the mode, feeds are displayed in rank order of the number of subscriptions from the users. For example, feed names are displayed on the left side of the screen in rank order, and if any one of the feeds is selected, a list of the posts of the feed is displayed. As another mode, a news article that is subscribed by another user who has a similar taste to the user is displayed. For example, on the left side of the screen, a list of the feed names is displayed.

Out of the characteristic parts of the embodiments described above, at least two characteristic parts can be combined.

It should be noted that the present disclosure may also take the following configurations.

(1) A system including:
a content obtaining circuit configured to obtain a plurality of content and information related to the content from at least one of a plurality of sources;
an importance obtaining circuit configured to obtain an importance level for each content, the importance level based on the information related to the content; and
a display control circuit configured to generate data to control a display of an image corresponding to each of the plurality of content, the display control circuit determining a size of each image on a display screen based on the importance level for each content.

(2) The system according to (1), wherein the display control circuit selects the size of each image on a display screen from among a plurality of different sizes based on the importance level.

(3) The system according to (1) or (2), wherein the information related to the content includes information from a plurality of users of a source of the content.

(4) The system according to (3), wherein the information related to the content includes information indicating a number of times the content has been accessed.

(5) The system according to (3), wherein the information related to the content includes information relating to a number of comments on the content.

(6) The system according to (3), wherein the information related to the content includes information relating to a number of times the content is added to a favorites list of a user.

(7) The system according to (3), wherein the information related to the content includes information relating to a number of time the content is indicated as being liked by a user.

(8) The system according to (4), wherein the information related to the content includes information relating to a number of times a user transmits information related to the content.

(9) The system according to (4), wherein the information related to the content includes information relating to a number of times a user reproduces the content.

(10) The system according to (3), wherein the information related to the content includes information relating to a number of content created by a creator of the content.

(11) The system according to (1) to (10), wherein the content obtaining circuit obtains the plurality of content and information related to the content from at least two social networking services.

(12) The system according to (1) to (11), wherein the display signal control circuit changes a geometry of the image based on the importance level.

(13) The system according to (12), wherein the display signal control circuit changes a shape of the image based on the importance level.

(14) The system according to (1) to (13), wherein the importance obtaining circuit calculates the importance level for each content.

(15) The system according to (1) to (14), wherein the content obtaining circuit obtains the content and the information related to the content from a server, and the importance obtaining circuit calculates the importance level for each content based on the information related to the content from the server and information related to the content stored in the system.

(16) The system according to (15), wherein the content obtaining circuit obtains the content and the information related to the content from a server, and the importance obtaining circuit calculates the importance level for each content based on a number of times the content is reproduced received from the server and a number of times the content has been reproduced by the system.

(17) The system according to (1) to (16), wherein the display control circuit arranges the image corresponding to each of the plurality of content in a first order along a first axis and in a second order along a second axis perpendicular to the first axis, the first order being based on a chronological order of each content and the second order being based on the importance level for each content.

(18) A method including:
obtaining a plurality of content and information related to the content from at least one of a plurality of sources;
obtaining an importance level for each content, the importance level based on the information related to the content; and
controlling a display of an image corresponding to each of the plurality of content, the controlling including selecting a size of each image on a display screen from among a plurality of different sizes based on the importance level for each content.

(19) A non-transitory computer readable medium encoded with computer readable instructions that, when performed by a processor, cause the processor to perform the method according to (18).

(20) A system including:
a memory configured to store data;
a battery configured to provide power to the system;
a content obtaining circuit configured to obtain a plurality of content and information related to the content from at least one of a plurality of sources;
an importance obtaining circuit configured to obtain an importance level for each content, the importance level based on the information related to the content;
a display; and
a display signal control circuit configured to control the display to display an image corresponding to each of the plurality of content, the display signal control circuit selecting a size of each image on a display screen from among a plurality of different sizes based on the importance level for each content.

(21) The system according to (2), wherein the display signal control circuit selects a size of the image from at least four different sizes based on the importance level.

(22) The system according to (1), wherein the system is a smartphone, personal computer, or tablet, and the content obtaining circuit obtains the content and the information related to the content from a server.

(23) The system according to (1), wherein the system is a smartphone, personal computer, or tablet, and the importance obtaining circuit obtains the importance level for each content from a server.

(24) The system according to claim (20), wherein the system is a smartphone or tablet.

(25) The system according to claim (20), wherein the display is a liquid crystal display.

(26) The system according to claim (20), wherein the display is an electroluminescence display.

(27) The system according to claim (20), wherein the display is an organic light emitting diode display.

(28) The system according to claim (20), wherein the display is a touch panel.

(29) An information processing apparatus, including:
an obtaining unit configured to obtain a plurality of pieces of content to be displayed;
a first setting unit configured to set an arrangement condition for arranging the plurality of pieces of content;
a calculation unit configured to calculate importance of each of the plurality of pieces of content;
a second setting unit configured to set a display condition for each of the plurality of pieces of content based on the importance calculated for each of the plurality of pieces of content; and
an arrangement unit configured to arrange the plurality of pieces of content based on the arrangement condition and the display condition set for each of the plurality of pieces of content.

(30) The information processing apparatus according to (29), in which the calculation unit is configured to calculate the importance based on at least one parameter relating to the content.

(31) The information processing apparatus according to (29) or (30), in which the first setting unit is configured to set arrangement order of the plurality of pieces of content as the arrangement condition.

(32) The information processing apparatus according to any one of (29) to (31), in which
the arrangement unit is configured to determine whether or not arrangement of the plurality of pieces of content is possible, and
the second setting unit is configured to change the display condition in a case where the arrangement is determined not possible.

(33) The information processing apparatus according to (32), in which
the arrangement unit is configured to determine whether or not the arrangement is possible for each of the plurality of pieces of content, and
the second setting unit is configured to change the display condition set for the content that is determined not possible to be arranged.

(34) The information processing apparatus according to any one of (29) to (33), in which
the second setting unit is configured to set, as the display condition, a display size obtained based on the importance for each of the plurality of pieces of content.

(35) The information processing apparatus according to (34), in which the second setting unit is configured
to associate a plurality of size ranks with the importance, each of the plurality of size ranks including at least one display size, and
to set any of the at least one display size for each of the plurality of pieces of content, the size rank associated with the importance of the content including the at least one display size.

(36) The information processing apparatus according to (35), in which the arrangement unit is configured to determine whether or not arrangement of the plurality of pieces of content is possible for each of the plurality of pieces of content, and the second setting unit is configured to set a different display size included in the size rank for the content that is determined not possible to be arranged, the size rank including the display size set for the content.

(37) The information processing apparatus according to (35) or (36), in which the arrangement unit is configured to determine whether or not arrangement of the plurality of pieces of content is possible for each of the plurality of pieces of content, and the second setting unit is configured to set the display size included in a different size rank for the content that is determined not possible to be arranged, the different size rank being different from the size rank including the display size set for the content.

(38) The information processing apparatus according to any one of (29) to (37), in which the calculation unit is configured to calculate a plurality of pieces of importance as the importance, and the second setting unit is configured to set a plurality of display conditions for each of the plurality of pieces of content based on the plurality of pieces of importance thus calculated.

The present application contains subject matter related to that disclosed in Japanese Priority Patent Application JP 2012-185772 filed in the Japan Patent Office on Aug. 24, 2012, the entire content of which is hereby incorporated by reference. It should be understood by those skilled in the art that various modifications, combinations, sub-combinations and alterations may occur depending on design requirements and other factors insofar as they are within the scope of the appended claims or the equivalents thereof.

REFERENCE SIGNS LIST 11, 21, 31, 91, 550, 551, 705, 801 content
50 size rank
60 tile size
70 score
100 network system
200 information processing apparatus
201 CPU
300 server

The invention claimed is:

1. A system, comprising:
a content obtaining circuit configured to obtain a plurality of content items and information related to each content item of the plurality of content items from at least one of a plurality of sources;
an importance obtaining circuit configured to calculate an importance level for each content item of the plurality of content items,
wherein the importance level is calculated based on the information related to each content item of the plurality of content items; and
a display control circuit configured to:
display an image that corresponds to each content item of the plurality of content items; and
determine a size and a shape of the image, that corresponds to each content item of the plurality of content items on a display screen, based on the importance level for each content item of the plurality of content items and a size rank of each content item of the plurality of content items,
wherein the size rank of each content item of the plurality of content items is determined based on a division of a difference between a first score and a second score by a number of size ranks,
wherein the first score is a maximum score of scores associated with the plurality of content items, and
wherein the second score is a minimum score of the scores associated with the plurality of content items.

2. The system according to claim 1,
wherein the display control circuit is further configured to select the size of the image from a plurality of sizes, and
wherein the selection is based on the importance level.

3. The system according to claim 1,
wherein the information is received from a plurality of users, and
wherein the plurality of users are associated with a source of each content item of the plurality of content items.

4. The system according to claim 1, wherein the information includes a number of times each content item of the plurality of content items has been accessed.

5. The system according to claim 1, wherein the information includes a number of comments on each content item of the plurality of content items.

6. The system according to claim 1, wherein the information includes a number of times each content item of the plurality of content items is added to a favorites list of a user.

7. The system according to claim 1, wherein the information includes a number of user likes associated with each content item of the plurality of content items.

8. The system according to claim 1, wherein the information includes a number of times the information related to each content item of the plurality of content items is transmitted by a user.

9. The system according to claim 1, wherein the information includes information related to a number of times each content item of the plurality of content items is reproduced by a user.

10. The system according to claim 1, wherein the information includes a number of content item created by a creator of each content item of the plurality of content items.

11. The system according to claim 1, wherein the content obtaining circuit is further configured to obtain the plurality of content items and the information related to each content item of the plurality of content items from at least two social networking services.

12. The system according to claim 1, wherein the display control circuit is further configured to change a geometry of the image based on the importance level.

13. The system according to claim 1, wherein the plurality of sources comprises at least one server.

14. The system according to claim 1, wherein the importance level for each content item of the plurality of content items is calculated based on a number of times each content item of the plurality of content items is reproduced by the system.

15. The system according to claim 1,
wherein the display control circuit is further configured to arrange the image that corresponds to each content item of the plurality of content items in a first order along a first axis of the display screen and in a second order along a second axis of the display screen perpendicular to the first axis, and
wherein the first order is based on a chronological order of each content item of the plurality of content items and the second order is based on the importance level for each content item of the plurality of content items.

16. A method, comprising:
- obtaining a plurality of content items and information related to each content item of the plurality of content items from at least one of a plurality of sources;
- calculating an importance level for each content item of the plurality of content items,
  - wherein the importance level is calculated based on the information related to each content item of the plurality of content items;
- displaying an image corresponding to each content item of the plurality of content items; and
- determining a shape and a size of the image, that corresponds to each content item of the plurality of content items on a display screen, based on the importance level for each content item of the plurality of content items and a size rank of each content item of the plurality of content items,
  - wherein the size rank of each content item of the plurality of content items is determined based on a division of a difference between a first score and a second score by a number of size ranks,
  - wherein the first score is a maximum score of scores associated with the plurality of content items, and
  - wherein the second score is a minimum score of the scores associated with the plurality of content items.

17. A non-transitory computer-readable medium having stored thereon computer-executable instructions that, when executed by a processor, cause a computer to perform operations, the operations comprising:
- obtaining a plurality of content items and information related to each content item of the plurality of content items from at least one of a plurality of sources;
- calculating an importance level for each content item of the plurality of content items,
  - wherein the importance level is calculated based on the information related to each content item of the plurality of content items;
- displaying an image corresponding to each content item of the plurality of content items; and
- determining a shape and a size of the image, that corresponds to each content item of the plurality of content items on a display screen, based on the importance level for each content item of the plurality of content items and a size rank of each content item of the plurality of content items,
  - wherein the size rank of each content item of the plurality of content items is determined based on a division of a difference between a first score and a second score by a number of size ranks,
  - wherein the first score is a maximum score of scores associated with the plurality of content items, and
  - wherein the second score is a minimum score of the scores associated with the plurality of content items.

18. A system, comprising:
- a memory configured to store data;
- a battery configured to provide power to the system;
- a content obtaining circuit configured to obtain a plurality of content items and information related to each content item of the plurality of content items from at least one of a plurality of sources;
- an importance obtaining circuit configured to calculate an importance level for each content item of the plurality of content items,
  - wherein the importance level is calculated based on the information related to each content item of the plurality of content items;
- a display screen; and
- a display signal control circuit configured to:
  - display an image that corresponds to each content item of the plurality of content items; and
  - determine a shape and a size of the image, that corresponds to each content item of the plurality of content items on the display screen, based on the importance level for each content item of the plurality of content items and a size rank of each content item of the plurality of content items,
    - wherein the size rank of each content item of the plurality of content items is determined based on a division of a difference between a first score and a second score by a number of size ranks,
    - wherein the first score is a maximum score of scores associated with the plurality of content items, and
    - wherein the second score is a minimum score of the scores associated with the plurality of content items.

* * * * *